(12) United States Patent
Hong et al.

(10) Patent No.: US 9,983,592 B2
(45) Date of Patent: May 29, 2018

(54) MOVING ROBOT, USER TERMINAL APPARATUS AND CONTROL METHOD THEREOF

(71) Applicant: Samsung Electronics Co., Ltd., Suwon-si, Gyeonggi-do (KR)

(72) Inventors: Soon-hyuk Hong, Suwon-si (KR); Jung-wook Kim, Suwon-si (KR); Nikolay Burlutskiy, Suwon-si (KR); Seung-young Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 14/251,055

(22) Filed: Apr. 11, 2014

(65) Prior Publication Data

US 2014/0316636 A1 Oct. 23, 2014

(30) Foreign Application Priority Data

Apr. 23, 2013 (KR) .......................... 10-2013-0044835

(51) Int. Cl.
*G01C 21/32* (2006.01)
*G05D 1/02* (2006.01)
*G01C 21/20* (2006.01)
*G05D 1/00* (2006.01)

(52) U.S. Cl.
CPC ......... *G05D 1/0274* (2013.01); *G01C 21/206* (2013.01); *G05D 1/0016* (2013.01); *G05D 2201/0203* (2013.01); *Y10S 901/01* (2013.01)

(58) Field of Classification Search
CPC .... G06T 7/00; G05D 3/00; G06K 9/00; G06F 19/00; G01C 21/32; Y01S 901/01
See application file for complete search history.

(56) References Cited

U.S. PATENT DOCUMENTS

| 8,475,275 B2* | 7/2013 | Weston | A63F 13/10 463/30 |
| 8,639,644 B1* | 1/2014 | Hickman | G05B 19/418 700/245 |
| 8,790,180 B2* | 7/2014 | Barney | A63F 13/08 463/39 |

(Continued)

FOREIGN PATENT DOCUMENTS

| KR | 10-2006-0078099 A | 7/2006 |
| KR | 10-2009-0039115 A | 4/2009 |

(Continued)

*Primary Examiner* — Yonel Beaulieu
*Assistant Examiner* — Martin A Weeks
(74) *Attorney, Agent, or Firm* — Jefferson IP Law, LLP

(57) ABSTRACT

A moving robot configured to generate a map of an environment of a territory and allow a user to set a structure of the territory and information on the map used for a location-based service and to use a more intuitively intelligent service is provided. The moving robot includes an operation performer configured to move around a territory and perform a certain operation, a detector configured to collect map building information of the territory, and a controller configured to control the moving robot to move to a set particular area within the territory by referring to the map information of the territory generated based on the collected map building information and control the operation performer to perform the operation with respect to the particular area.

12 Claims, 27 Drawing Sheets

(56) References Cited

U.S. PATENT DOCUMENTS

| | | | |
|---|---|---|---|
| 2007/0156286 A1* | 7/2007 | Yamauchi | G05D 1/0038 700/245 |
| 2007/0192910 A1* | 8/2007 | Vu | B25J 5/007 700/245 |
| 2008/0086236 A1* | 4/2008 | Saito | G01S 5/0252 700/245 |
| 2008/0154429 A1* | 6/2008 | Lee | G05D 1/0272 700/258 |
| 2010/0161225 A1* | 6/2010 | Hyung | G06T 7/2006 701/301 |
| 2010/0332128 A1* | 12/2010 | Ikeuchi | G01C 21/32 701/532 |
| 2011/0077802 A1 | 3/2011 | Halloran et al. | |
| 2011/0205338 A1 | 8/2011 | Choi et al. | |
| 2012/0095619 A1* | 4/2012 | Pack | G05D 1/0038 701/2 |
| 2012/0182392 A1* | 7/2012 | Kearns | B25J 11/009 348/46 |
| 2012/0185091 A1* | 7/2012 | Field | G05D 1/0044 700/254 |
| 2013/0056032 A1 | 3/2013 | Choe et al. | |
| 2014/0350839 A1* | 11/2014 | Pack | G01C 21/30 701/409 |

FOREIGN PATENT DOCUMENTS

| | | |
|---|---|---|
| KR | 10-2010-0095923 A | 9/2010 |
| KR | 10-2010-0109257 A | 10/2010 |
| KR | 10-2011-0097140 A | 8/2011 |
| KR | 10-2012-0137900 A | 12/2012 |
| KR | 10-2013-0027355 A | 3/2013 |

\* cited by examiner

SENSE ENVIRONMENT THROUGH
3D SENSOR AND GENERATE MAP
BY ROBOT (3D SLAM)

GENERATE 3D INTERIOR
ENVIRONMENTAL MODEL
(WALL EXTRACTION/AUTOMATIC
CLASSIFICATION OF TERRITORY/
AUTOMATIC PERFORMANCE)

2D/3D CONVERSION
(MODIFY MODEL THROUGH
AUTHORING TOOL)

PROVIDE SERVICE THROUGH
MOVING ROBOT BASED ON
MAP OF TERRITORY

FIG. 19
[REMOTE CONTROL]
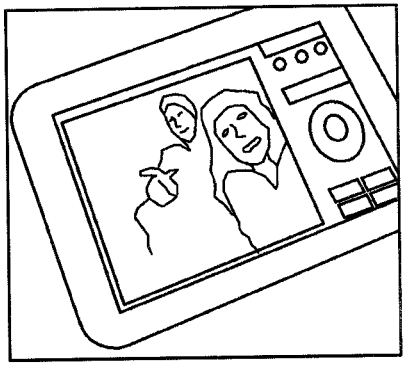
1. MANUAL MANIPULATION TO MOVE TO CHUL-SOO'S ROOM BY VIEWING IMAGE
2. CLEAN THE ROOM
AS-IS
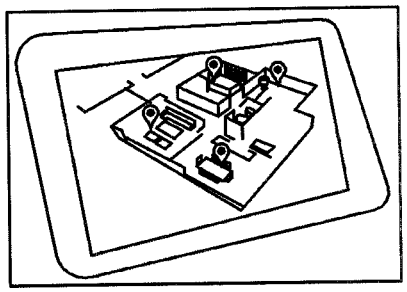
1. SELECT CHUL-SOO'S ROOM ON THE MAP AT A TIME AND CLEAN THE ROOM OR
2. GIVE VOICE COMMAND "CLEAN CHUL-SOO'S ROOM"
TO-BE

MOVING ROBOT, USER TERMINAL APPARATUS AND CONTROL METHOD THEREOF

CROSS-REFERENCE TO RELATED APPLICATION(S)

This application claims the benefit under 35 U.S.C. § 119(a) of a Korean patent application filed on Apr. 23, 2013 in the Korean Intellectual Property Office and assigned Serial No. 10-2013-0044835, the entire disclosure of which is hereby incorporated by reference.

TECHNICAL FIELD

The present disclosure relates to a moving robot, a user terminal apparatus, and a control method thereof. More particularly, the present disclosure relates to a moving robot, a user terminal apparatus and a control method thereof which generates a map of an environment of a territory and allows a user to set a structure of the territory and information on the map used for a location-based service and to use a more intuitively intelligent service.

BACKGROUND

To provide service within an existing territory, a robot system is configured to recognize the environment and to automatically provide specific services. For example, a structure of the territory identified by a robot is used by the robot itself, and a user uses specific services. However, more and more devices including cleaning robots have become smart, and therefore, a more expandable service is needed.

A smart device which is capable of moving within the territory includes a cleaning robot, and such robot should identify and visualize the home environment and provide location-based service to provide a user with a more intelligent service.

For example, a main function of existing cleaning robots is to recognize and explore every corner of the environment in the territory and clean the territory. As the performance of functions, such as cleaning, and the like, is voluntarily conducted by the detection capability of the robot without a user's interference, the robot should provide extended functions or perform more user-friendly functions.

The robot identifies the environment of the territory, but the map of the territory is simple. Thus, a user who uses the robot with such map is inconvenienced.

Therefore, a need exists for a moving robot, a user terminal apparatus, and a control method thereof which generates a map of an environment of a territory and allows a user to set a structure of the territory and information on the map used for a location-based service and to use a more intuitively intelligent service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a moving robot, a user terminal apparatus, and a control method thereof which generates a map of an environment of a territory and allows a user to set a structure of the territory and information on the map used for a location-based service and to use a more intuitively intelligent service.

In accordance with an aspect of the present disclosure, a moving robot is provided. The moving robot includes an operation performer configured to move around a territory and perform a certain operation, a detector configured to collect map building information of the territory, and a controller configured to control the moving robot to move to a set particular area within the territory by referring to the map information of the territory generated based on the collected map building information and control the operation performer to perform the operation with respect to the particular area.

The controller may set the particular area according to a user's command.

The controller may set the operation according to a user's command.

The user's command for setting the particular area may include information of at least one of a device or a structure located in the particular area, and the controller may set the particular area based on the information.

The user's command may include at least one of a user's gesture and a voice or a command given through a pointing device.

The user's command may include location information, and the controller may move the moving robot to the particular area and may set the particular area based on the location information.

The user's command may include operation information, and the controller may move the moving robot to the particular area and may perform the operation based on the operation information.

The moving robot may further include a user input part configured to input a user's command including territorial reference information, and the controller may collect the map building information of the territory by referring to the territorial reference information input through the user input part.

The moving robot may further include a voice output part configured to output a voice message, the controller may control the voice output part to output a voice message to set at least one of the particular area or the operation corresponding to a user's command.

The controller may sequentially perform the operation based on location of a plurality of particular areas, if the operation information of the plurality of particular areas is input.

If a preset condition occurs, the controller may move the moving robot to the particular area corresponding to the occurred condition and may perform a preset operation.

In accordance with another aspect of the present disclosure, a control method of a moving robot is provided. The method includes moving, by an operation performer, around a territory and collecting map building information of the territory, moving, by a controller, to a particular area set within the territory by referring to the map information of the territory which has been generated based on the collected map building information, and performing, by the operation performer, the operation with respect to the particular area.

The moving around a territory may include setting the particular area according to a user's command.

The performing of the operation may include setting the operation according to a user's command.

The user's command for setting the particular area may include information of at least one of a device or a structure located in the particular area, and the moving around a territory may include setting the particular area based on the information.

The user's command may include at least one of a user's gesture and a voice or a command given through a pointing device.

The setting of the particular area may include moving to the particular area and setting the particular area based on location information which is included in the user's command.

The collecting of the map building information may include collecting the map building information of the territory by referring to the territorial reference information which is input through a user input part.

The setting of the particular area and operation may include outputting a voice message to set at least one of the particular area or the operation corresponding to a user's command.

The performing of the operation may include sequentially performing the operation based on location of a plurality of particular areas, if the operation information of the plurality of particular areas is input.

The moving around a territory may include moving to the particular area corresponding to a preset condition, if the preset condition occurs, and the performing of the operation may include performing a preset operation.

In accordance with another aspect of the present disclosure, a user terminal apparatus is provided. The apparatus includes a communication part configured to communicate with a moving robot, which moves around a territory and perform an operation, a display unit configured to display an image of the moving robot thereon, a user input part configured to input a user's command, and a controller configured to control the display unit to display map information of the territory thereon, set a particular area within the territory according to the user's command, and transmit information of the set particular area to the moving robot.

The controller may name the particular area according to a user's command.

The controller may set the operation according to a user's command.

The user's command for setting the particular area may include at least one of a device or a structure located in the particular area, and the controller may set the particular area based on the information.

The controller may set the particular area by using at least one of a user's gesture and a voice or a command given through a pointing device.

The user's command may include location information, and the controller may transmit the location information to the moving robot to move the moving robot to the particular area and may set the particular area.

The user's command may include operation information, and the controller may transmit the operation information to the moving robot to perform the operation.

The controller may transmit territorial reference information to the moving robot to collect map building information of the territory.

The controller may receive a voice message to set at least one of the particular area or the operation, and may set the at least one of the particular area or the operation.

The controller may transmit the operation information of the plurality of particular areas to the moving robot to allow the moving robot to sequentially perform the operation based on location of the plurality of particular areas.

The controller may set a certain condition and a certain operation with respect to the territory according to a user's command and may transmit the condition and operation to the moving robot.

In accordance with another aspect of the present disclosure, a control method of a user terminal apparatus is provided. The method includes displaying, by a display unit, map information of the territory, setting, by a controller, a particular area within the territory according to the user's command, and transmitting, by the controller, information of the set particular area to the moving robot.

The setting of the particular area may include naming the particular area according to a user's command.

The setting of the particular area may include setting the operation according to a user's command.

The user's command for setting the particular area may include at least one of a device or a structure located in the particular area, and the setting of the particular area may include setting the particular area by the controller based on the information.

The setting of the operation may include setting the operation by using at least one of a user's gesture and a voice or a command given through a pointing device.

The naming of the particular area may include naming the particular area by moving to the particular area based on location information which is included in the user's command.

The setting of the operation may include transmitting the operation information, which is included in the user's command, to the moving robot to perform the operation.

The displaying of the map information may include transmitting territorial reference information to the moving robot to collect map building information of the territory.

The naming of the particular area and the setting of the operation may include receiving a voice message to set at least one of the particular area or the operation, and setting the at least one of the particular area or the operation.

The transmitting of the operation information to the moving robot may include transmitting the operation information of the plurality of particular areas to sequentially perform the operation by the moving robot based on location of the plurality of particular areas.

The transmitting of the operation information to the moving robot may include setting a certain condition and operation within the territory according to a user's command and transmitting the condition and operation to the moving robot.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 18 and 19 illustrate a location-based service using a map of a territory after a map has been generated according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
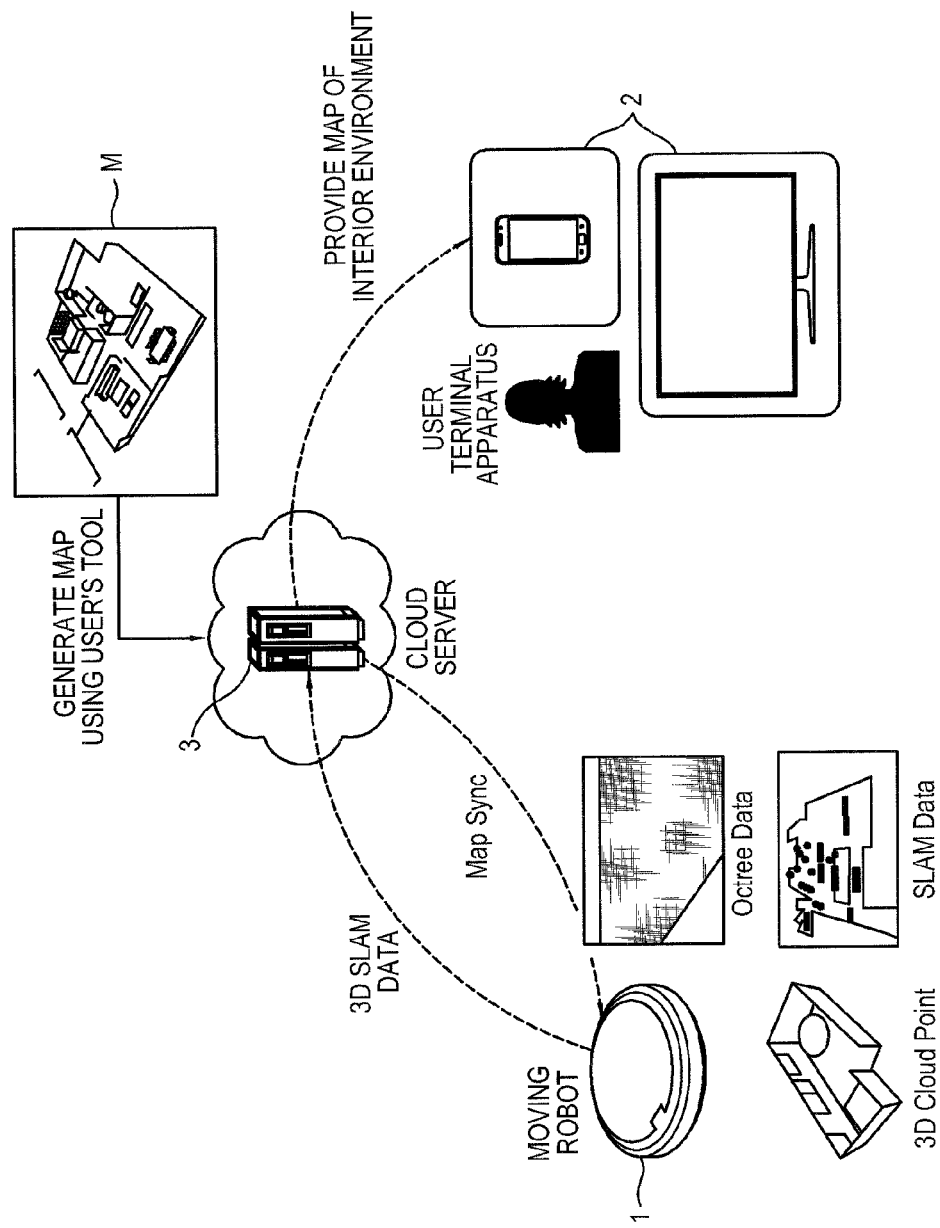
FIG. 1 is a schematic view of a system for generating a map of a territory by using a moving robot according to an embodiment of the present disclosure.

FIG. 1 is a schematic view of a system for generating a map of a territory by using a moving robot according to an embodiment of the present disclosure.

Referring to FIG. 1, a moving robot 1, which includes a three-dimensional (3D) detecting system, such as a 3D depth sensor, an RGB camera, and an odometer (i.e., a wheel encoder, a gyro sensor, and the like) which is capable of measuring a distance traveled by a vehicle, and may freely move around a territory. The territory may be a space, an area, a point where a moving robot 1 freely move around, and the like. When a moving robot 1 is a cleaning robot, the entire area of a user's home may be the territory. Here, a detecting system or a detector may be a sensor, and the sensor may be a detecting system or a detector.

The moving robot 1 extracts 3D point data of the environment of the territory by using a system as shown in FIG. 1, and continues to generate and update a location of the moving robot 1 and a map of the ambient environment through the extracted data. Such function is called 3D Simultaneous Localization And Mapping (SLAM). As a result of the 3D SLAM, the map information of the territory and the 3D point data identified and extracted by the moving robot 1 may be obtained. The moving robot 1 may include a SW module for processing the 3D point data from the 3D SLAM and extracting an outer wall of the environment of the territory, and a SW module for classifying areas of the territory based on the extracted outer wall.

A cloud-based server or a home cloud stores/processes internal environment detecting information provided by a moving device and provides map information of the territory to a user terminal apparatus 2, and may include a home cloud of the territory or an external cloud server 3. The cloud-based server or the home cloud may provide a user with an authoring tool for a user to modify/supplement map information of the territory which is automatically generated.

The user terminal apparatus 2, which is used to manipulate the moving robot 1 and execute a command by using the generated map, may be implemented as a smart phone/smart tab/smart pad, a smart TV, and the like. The user terminal apparatus 2 may directly communicate with, and receive the generated map of the territory from, the moving robot 1, or may be connected to, and receive the map from, the home cloud or the external cloud server 3, and may control the moving robot 1 or other devices in the territory by using the generated map of the territory.

Figure 24:
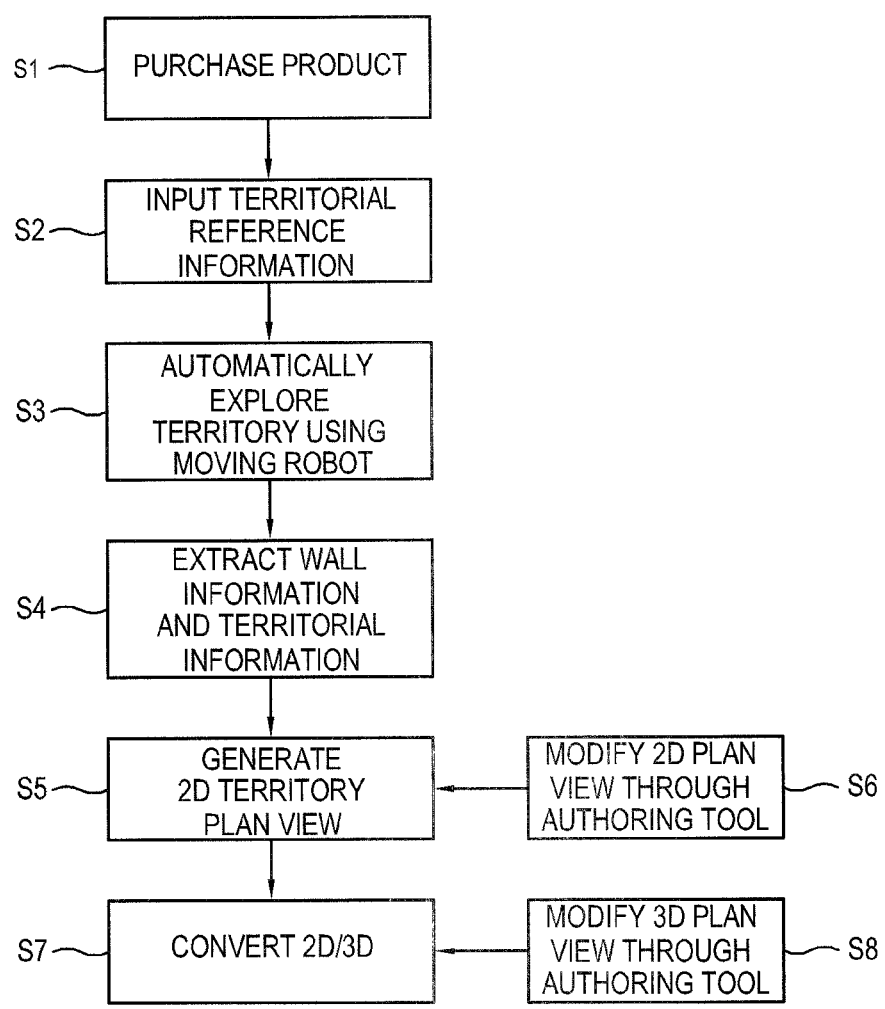
FIG. 24 is a flowchart for generating a map of a territory by using a moving robot according to an embodiment of the present disclosure.

Hereinafter, a flowchart for generating the map of the territory by using the moving robot 1 as shown in FIG. 24 will be described. As an example, a case where a user purchases and uses the moving robot 1 within his/her territory will be described.

FIG. 24 is a flowchart for generating a map of a territory by using a moving robot according to an embodiment of the present disclosure. More specifically, FIG. 24 shows a process of purchasing the moving robot 1 by a user and generating a 3D map through automatic exploration of the structure of the territory by the moving robot 1.

Referring to FIG. 24, when a user purchases the moving robot 1 at operation S1, he/she may input territorial reference information on a territory at operation S2. For example, a user may input the number of rooms, the number of smart devices (i.e., a refrigerator, an air-conditioner, a TV, and the like), and existence/non-existence of a wireless Access Point (AP) within the territory through Q&A. In this case, a user may utilize a smart phone and input the territorial reference information 146 based on a Graphic User Interface (GUI) or utilize a voice recognition/outputting function of the moving robot 1. A user may manipulate the moving robot 1 to move to a particular location and to memorize the location information. For example, a user may move the moving robot 1 to a particular location and name the concerned location as "living room", "in front of the air-conditioner", and the like.

After inputting the territorial reference information 146 of the environment of the territory, a user manipulates the moving robot 1 to automatically explore the environment of the territory at operation S3. The moving robot 1 calculates the moved trace and assumes the current location and traveling direction thereof through a wheel encoder (not shown) and a gyro sensor (not shown). The moving robot 1 further includes a 3D sensor to obtain a real picture image of the front side of the moving robot 1 and depth information for an object corresponding to the image and thus, may perform 3D SLAM through the 3D sensor. The 3D SLAM extracts characteristics from the real picture image and extracts unchanged characteristics between two consecutive images to trace the movement of the moving robot 1, and may be additionally used to assume the location and traveling direction of the moving robot 1 in addition to the wheel encoder and gyro sensor to improve the assumption performance.

In the course of the aforementioned process, the moving robot 1 obtains 3D environmental information and 3D point data for structures in the territory. Through the automatic exploration (3D SLAM) of the territory through the moving robot 1, the current location and traveling direction of the moving robot 1 and the 3D point data of the structures within the territory are obtained. If the moving robot 1 explores the entire territory, the 3D point data for the entire interior environment may be obtained.

The obtained 3D point data of the interior environment may be used to generate a map of the territory. To generate a map, wall information of the territory may be extracted from the 3D point data. First, the part which is assumed to be a wall is extracted based on the outermost points of the 3D point data to identify the outer wall structure of the territory. Structure data of the space which has been removed other than the data for wall modeling may be used as map information when a manual modeling is performed through a user authoring tool.

The moving robot 1 may process images and recognize particular devices located in the territory, such as a smart TV, an air-conditioner, and a refrigerator, through the real picture image of the front side and 3D point data, and calculate a correlative location of the device based on the current location of the moving robot 1 to extract the location of the smart device located in the territory at operation S4. The location of the smart device in the territory may be registered with the map and used for location-based service after the map of the territory is generated subsequently at operation S5.

If the wall information of the territory is extracted, the interior space may be classified into several areas. For example, the interior space may be classified into a living room, a room 1, a room 2, and a kitchen. However, as the map information which has been automatically extracted does not show which area is a living room or a room, the area should be set by a user's input. To do the foregoing, a user may utilize an authoring tool or a program of a smart phone to input a particular area with respect to the territory or name a particular area by manipulating the moving robot 1. For example, a user may name the particular area as "living room", "kitchen", "Young-soo's room", "Chul-soo's room", and the like."

The extraction of the wall information of the space as collected by the moving robot 1 is automatically performed, and as a result of the extraction, a 2D plan view of the environment of the territory may be extracted. A user may determine whether the automatically extracted 2D plan view is the same as the real environment, and if not, may modify the extracted wall information through a user authoring tool at operation S6.

If the 2D plan view of the interior space is generated through the foregoing process, a 3D map of the interior space may be automatically generated through 2D-3D conversion. The 3D map may be generated by applying a certain thickness and height to the outer wall of the 2D plan view. The 3D map of the interior space, which has been automatically converted through the user authoring tool at operation S8, may be used to generate a map of a user specific area by adding interior structures, e.g., tables, chairs, and the like, in addition to the wall which has been formed through the user authoring tool.

The 3D map of the interior environment of the territory which has been generated through the foregoing processes as in FIG. 24 may be used to automatically form a wall through 3D detecting data of the moving robot 1 and generate interior structures through the user authoring tool. A particular area may be set in the generated 3D map, and locations of smart devices which may be recognized within the territory including a smart TV and an air-conditioner may be indicated in the map.

Therefore, the 3D map of the interior environment may be used to provide intelligent service including performance of commands through the moving robot 1 based on location.

The generation of the 2D plan view of the interior environment of the territory through the wall information and territorial information generating module in FIG. 24 may be performed by the moving robot 1 itself, and the 2D-3D conversion and the 3D user authoring may be separately performed through a PC.

Figure 2:
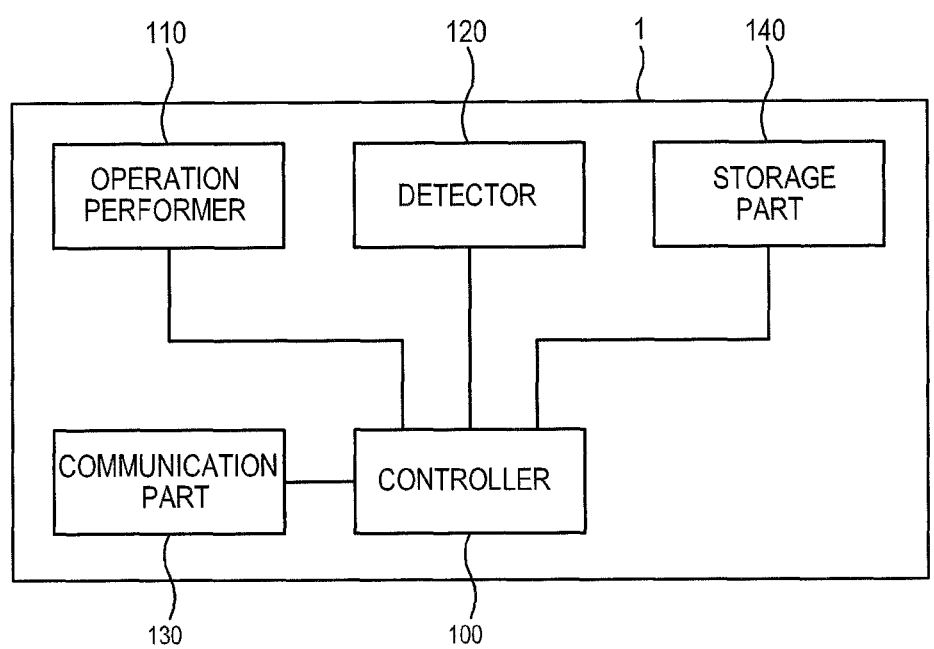
FIG. 2 is a block diagram of a moving robot according to an embodiment of the present disclosure.

In the system as in FIG. 1, the moving robot 1 may "extract wall information and territory information" at operation S4, "generate a 2D plan view" at operation S5 and "convert 2D-3D" at operation S7 as in FIG. 2, and may generate the 2D and 3D maps of the interior space through the 2D/3D authoring tool in the cloud server 3 in FIG. 1. For example, the 2D plan view generated by the moving robot 1 and the 3D map which has been automatically converted may be updated by the cloud server 3 by sharing the changes made by a user. If the exploration results for the territory are updated, the 2D plan view and 3D model of the cloud server 3 may also be updated.

A particular area may be information that is shared among the moving robot 1, the cloud server 3, and the user terminal apparatus in FIG. 1. A user may move the moving robot 1 to a particular location and set such particular area (meaning information, such as "Chul-soo's room", "Young-hee's room", and the like), and the particular area may be updated in sync with the cloud server 3. When the cloud server 3 sets a particular area through a 2D/3D authoring tool, the set particular area may be stored together with the 2D plan view in the moving robot 1. The user terminal apparatus 2, such as a smart phone, may receive the 2D plan view or 3D model data from the cloud server 3 or the moving robot 1, and a user may set the particular area in the automatically extracted territory of the model or modify the particular area, and update/store the particular area in the cloud serve 3 or the moving robot 1.

FIG. 2 is a block diagram of a moving robot according to an embodiment of the present disclosure.

Referring to FIG. 2, the moving robot 1 may include an operation performer 110, a detector 120, a communication part 130, a storage part 140, and a controller 100.

The operation performer 110 enables the moving robot 1 to move around, and rotate a sensor to detect the territory. For example, if the moving robot 1 is implemented as a cleaning robot, the operation performer 110 may perform a suction operation for cleaning. In addition, the operation performer 110 may detect fire upon occurrence thereof and inform a user of such occurrence and perform relevant operations. The operation performer 110 is provided as an element of the moving robot 1 and may perform operations of the moving robot 1, and as software to act as a controller and perform other operations. If the operation performer 110 is provided as software, it may be provided in the same space as the controller 100 and included therein.

The detector 120 may be implemented as a sensor to detect locations of walls, devices, and structures in the territory. The detector 120 may automatically explore the surroundings by a control of the controller 100 and may detect locations. Here, the sensor and the detector may be used interchangeably for sensing or detecting locations of walls, devices, structures, and the like.

The communication part 130 may receive signals from an external input. The communication part 130 may receive various wireless signals according to certain wireless communication specifications.

The communication part 130 may further include various additional elements, such as a wireless communication module (not shown) for wireless communication or a tuner (not shown) for turning a broadcasting signal, depending on a design type of the moving robot 1 as well as an element for receiving signals/data from an external input. The communication part 130 may transmit information/data/signals of the moving robot 1 to an external device as well as receiving signals from an external device. For example, the communication part 130 is not limited to the element for receiving signals from an external device, and may be implemented as an interface for interactive communication. The communication part 130 may receive a control signal from a plurality of control devices to select a User Interface (UI). The communication part 130 may be provided as a communication module for known wireless local area communication, such as Wi-Fi, Bluetooth, Infrared (IR), Ultra Wideband (UWB), Zigbee, and the like, or as a mobile communication module, such as 3G, 4G, or Long Term Evolution (LTE), or as a known communication port for a wired communication. The communication part 130 may be used for various purposes including inputting commands for manipulating display and transmitting and receiving data as well as inputting a control signal to select a UI.

The storage part 140 may be provided as a writable Read Only Memory (ROM) to have data remain therein even upon cut-off of power to the moving robot 1 and to reflect changes made by a user. For example, the storage part 140 may be provided as one of a flash memory, an Erasable Programmable ROM (EPROM), and an Electrically Erasable Programmable ROM (EEPROM). The storage part 140 may automatically store therein detection data of the detector 120 and map information by a control of the controller 100. The storage part 140 may store therein information of conditions and operations which have been set by a manufacturer and a user.

The controller 100 may control overall operations of the moving robot 1. The controller 100 may control the operation performer 110 to move around the territory and collect map building information of the territory through the detector 120. The controller 100 may control the moving robot 1 to move to a particular area within the territory by referring to the map information of the territory which has been generated based on the collected map building information and perform operations to the particular area.

Figure 3:
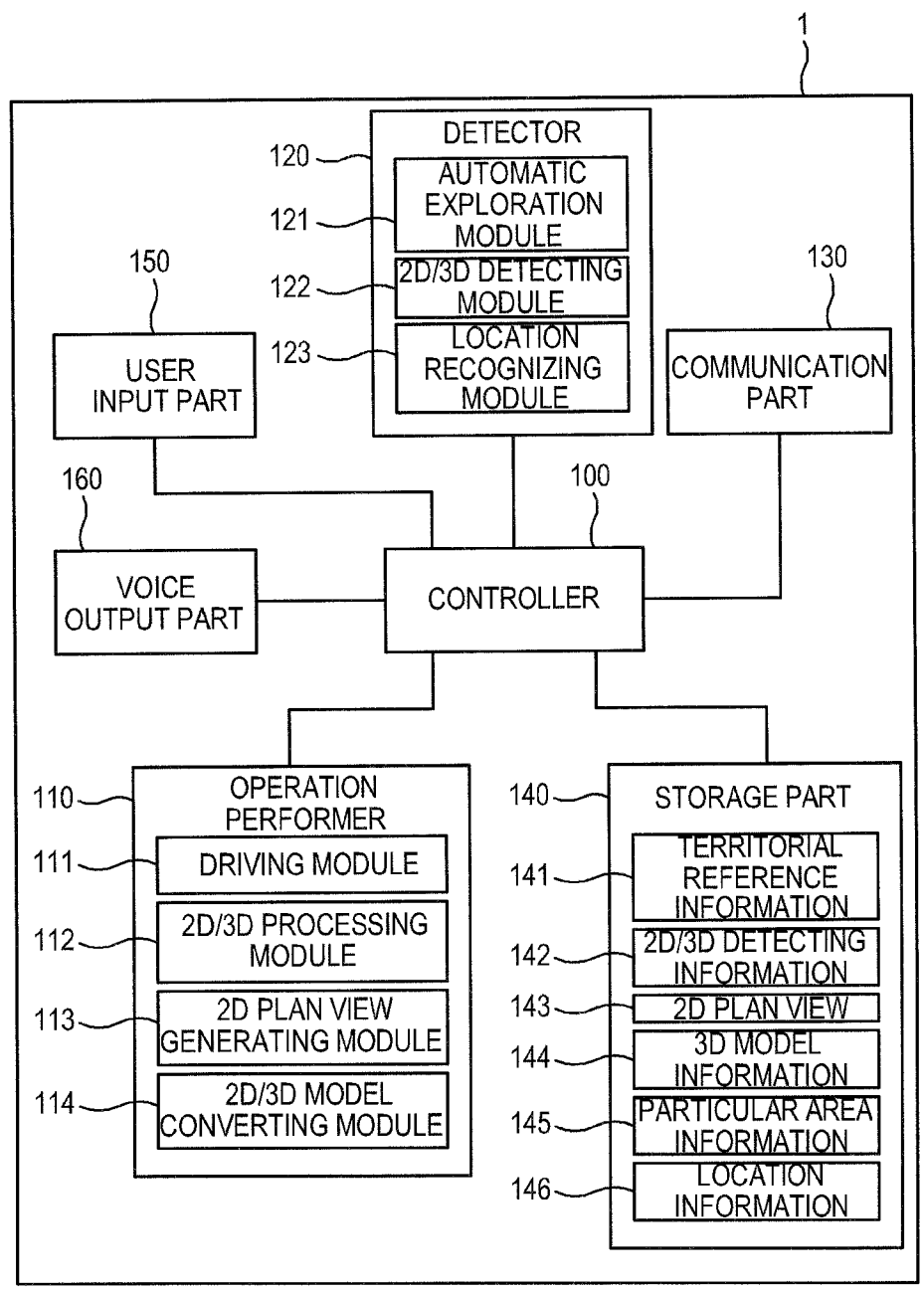
FIG. 3 is a block diagram of a moving robot according to an embodiment of the present disclosure.

FIG. 3 is a block diagram of a moving robot according to an embodiment of the present disclosure.

Referring to FIG. 3, the moving robot 1 may include the operation performer 110, the detector 120, the communication part 130, the storage part 140, and the controller 100 as in FIG. 2, and may further include a user input part 150 and a voice output unit 160.

The user input part 150 transmits preset various control commands or information to the controller 100 according to a user's manipulation and input. The user input part 150 may be implemented as a menu key or an input panel installed in an external side of the moving robot 1 or as a remote controller which is separated and spaced from the moving robot 1. Otherwise, the user input part 150 may be integrally formed in a display unit (not shown). If the display unit is a touch screen, a user may touch an input menu (not shown) displayed on the display unit and transmit a preset command to the controller 100.

The user input part 150 may detect a user's gesture through a sensor and transmit a user's command to the controller 100, and transmit a user's voice command to the controller 100 to perform operations and setup.

The voice output unit 160 may output a voice message to a user and the user terminal apparatus 2 by a control of the controller 100 to set a user's command. For example, the voice output unit 160 may output a voice message, such as "Will you name the area?", and determine a user's setup of a particular area.

Referring to FIG. 3, the operation performer 110 may include a driving module 111 for movement of the moving robot 1, a 2D/3D processing module 112 which processes information detected by the detector 120, a 2D plan view generating module 113, and a 2D-3D model converting module 114. If the operation performer 110 is configured as software, it may be included in the controller 100. If the operation performer 110 is provided as hardware, it may be separately provided from the controller 100 and perform operations.

The storage part 140 may store particular area information 145, 2D/3D detecting information 142 detected by the detector 120, a 2D plan view 143, 3D model information 144, territorial reference information 141, and device location information 146 of home appliances within the territory, in each area by a control of the controller 100.

The detector 120 detects the territory and may include an automatic exploration module 121, a 2D/3D detecting module 122 and a location recognizing module 123.

The controller 100 may set a particular area according to a user's command and set operations according to a user's command. The user's command may include information of at least one of a device or a structure located in a particular area, and the controller 100 may set the particular area based on such information.

The user's command includes at least one of a user's gesture and a voice or commands given through a pointing device, and the controller may control devices through the user's commands. The user's command includes location information, and the controller 100 may move to, and set, a particular area based on the location information. The user's command also includes operation information, and the controller 100 may move to a particular area and perform operations based on the operation information. The moving robot 1 further includes the user input part 150 to receive a user's command including a particular area, and the controller 100 may collect map building information of the territory by referring to the territorial reference information input through the user input part 150. The controller 100 may control the voice output part 160 to output a voice message to set at least one of a particular area or operation corresponding to the user's command. If operation information of a plurality of particular areas is input, the controller 100 may control the relevant elements to sequentially perform operations based on the location of the plurality of particular areas. If a preset condition occurs, the controller 100 may control the operation performer 110 to move to a particular area and perform a preset operation corresponding to the condition.

Figure 4:
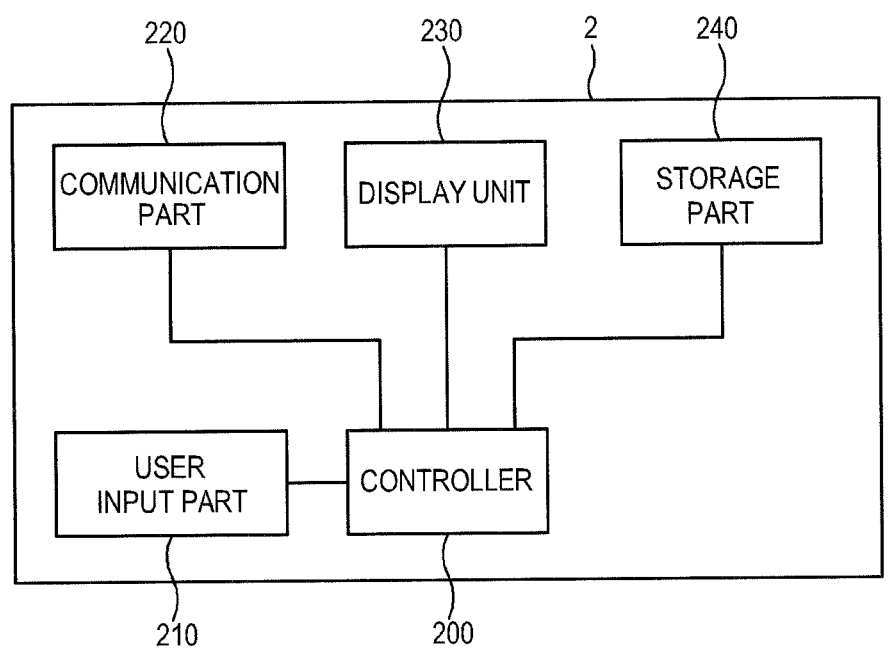
FIG. 4 is a block diagram of a user terminal apparatus according to an embodiment of the present disclosure.

FIG. 4 is a block diagram of a user terminal apparatus according to an embodiment of the present disclosure.

Referring to FIG. 4, the user terminal apparatus 2 may include a user input part 210, a communication part 220, a display unit 230, a storage part 240, and a controller 200.

The user input part 210 transmits preset various control commands or information to the controller 200 according to a user's manipulation and input. The user input part 210 may be implemented as a menu key or input panel installed in an external side of the user terminal apparatus 2 or as a remote controller which is separated and spaced from the user terminal apparatus 2. Otherwise, the user input part 210 may be integrally formed in the display unit 230. If the display unit 230 is a touch screen, a user may touch an input menu (not shown) displayed on the display unit 230 and transmit a preset command to the controller 200.

The user input part 210 may detect a user's gesture through a sensor and transmit a user's command to the controller 200, and transmit a user's voice command to the controller 200 to perform operations and setup.

The communication part 220 may receive signals from an external input. The communication part 220 may receive various wireless signals according to certain wireless communication specifications.

The communication part 220 may further include various additional elements, such as a wireless communication module (not shown) for wireless communication or a tuner (not shown) for turning a broadcasting signal, depending on a design type of the user terminal apparatus 2 as well as an element for receiving signals/data from an external input. The communication part 220 may transmit information/data/signals of the user terminal apparatus 2 to an external device as well as receiving signals from an external device. For example, the communication part 220 is not limited to the element for receiving signals from an external device, and may be implemented as an interface for interactive communication. The communication part 220 may receive a control signal from a plurality of control devices to select a UI. The communication part 220 may be provided as a communication module for known wireless local area communication, such as Wi-Fi, Bluetooth, IR, UWB, Zigbee, and the like, or as a mobile communication module, such as 3G, 4G, or LTE, or as a known communication port for a wired communication. The communication part 220 may be used for various purposes including inputting commands for manipulating display and transmitting and receiving data as well as inputting a control signal to select a UI.

The storage part 240 may be provided as a writable ROM to have data remain therein even upon cut-off of power to the user terminal apparatus 2 and to reflect changes made by a user. For example, the storage part 240 may be provided as one of a flash memory, an EPROM, and an EEPROM. The storage part 240 may automatically store therein detection data of a detector (not shown) and map information by a control of the controller 200. The storage part 240 may store therein information of conditions and operations which have been set by a manufacturer and a user.

The display unit 230 displays an image thereon based on an image signal output by an image processor (not shown). The display unit 230 may be implemented as various displays including a Liquid Crystal Display (LCD), a plasma, a Light-Emitting Diode (LED), an Organic Light-Emitting Diode (OLED), a surface-conduction electron-emitter, a carbon nano-tube, a nano-crystal, and the like, but not limited thereto.

The display unit 230 may further include additional elements depending on an embodiment type thereof. For example, the display unit 230 as a liquid crystal may include an LCD panel (not shown), a backlight unit (not shown) for emitting light to the LCD panel, and a panel driving substrate (not shown) for driving the LCD panel.

The controller 200 may display map information of the territory on the display unit 230, set a particular area in the territory according to a user's command, and transmit information of the set particular area to the moving robot 1.

Figure 5:
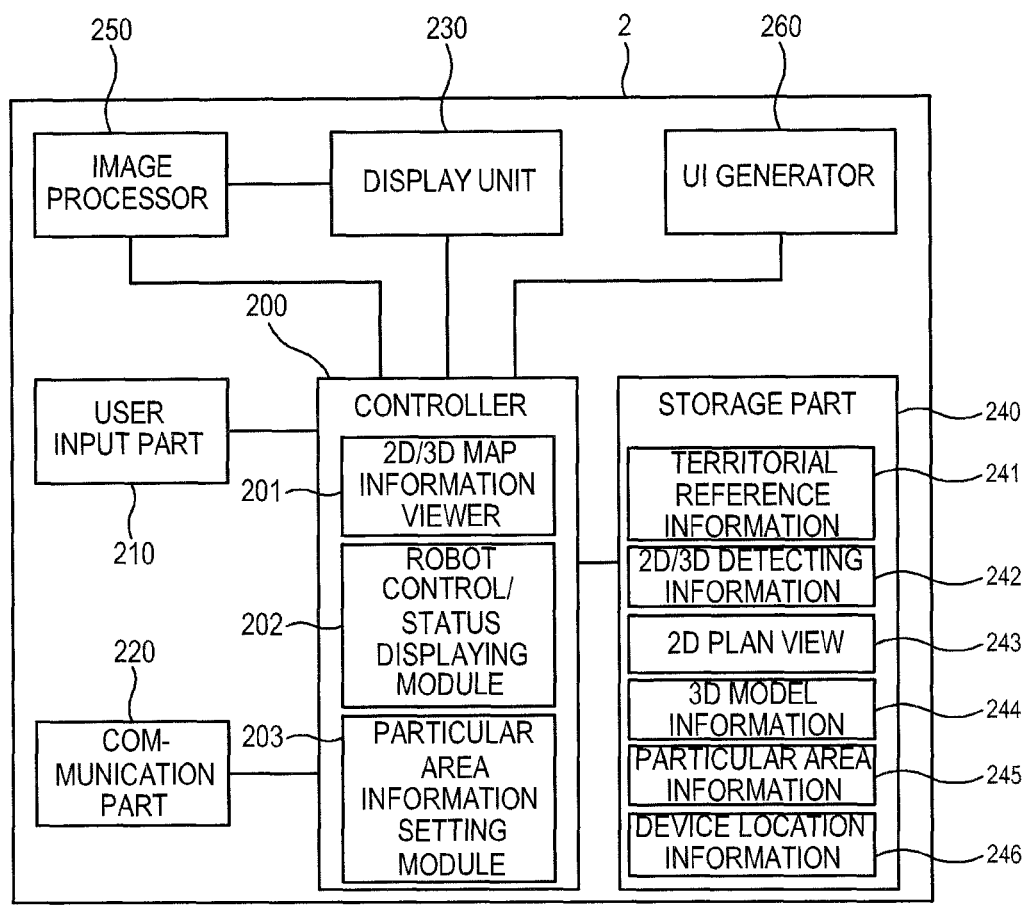
FIG. 5 is a block diagram of a user terminal apparatus according to an embodiment of the present disclosure.

FIG. 5 is a block diagram of a user terminal apparatus according to an embodiment of the present disclosure.

Referring to FIG. 5, the user terminal apparatus 2 includes the user input part 210, the communication part 220, the display unit 230, the storage part 240, and the controller 200 as in FIG. 4, and may further include an image processor 250 and a UI generator 260.

The type of the image processing operations of the image processor 250 may include, e.g., a decoding operation corresponding to an image format of image data, a de-interlacing operation for converting interlace image data into progressive image data, a scaling operation for adjusting image data into a preset resolution, a noise reduction operation for improving a quality of an image, an enhancement operation, a frame refresh rate conversion, and the like, but not limited thereto.

The image processor 250 may be implemented as a System-On-Chip (SOC) which integrates the foregoing functions or as an image processing board (not shown) which is formed by installing individual elements performing such processes, on a Printed Circuit Board (PCB) (not shown) and provided in the user terminal apparatus 2.

The UI generator 260 may generate a UI for executing an application. The generated UI may include a plurality of sub UIs provided in the form of icons and texts, and if a particular sub UI is selected through the user terminal apparatus 2, an application program may be executed corresponding to the selected sub UI. For example, respective sub UIs may be generated per function or event to execute the application program.

The UI generator 260 means software or hardware function for generating and controlling UIs displayed on the display unit 230, and the function may be performed by the controller 200 which is described below. For example, there is no need to provide the UI generator 260 as a separate chipset or a separate microprocessor.

The storage part 240 may store therein territorial reference information 241, 2D/3D detecting information 242, a 2D plan view 243, 3D model information 244, particular area information 245, and device location information 246 by a control of the controller 200.

The controller 200 may include a viewer program 201 to view 2D/3D map information, a control/status displaying module 202 for the moving robot 1, and a particular area information setting module 203.

The controller 200 may name a particular area according to a user's command and set operations according to a user's command.

The user's command for setting the particular area may include at least one of a device or a structure located in the particular area. The controller 200 may set the particular area based on at least one of the device or structure located in the particular area. The controller 200 may set the particular area by using at least one of a user's gesture and a voice or commands given through a pointing device. The user's command includes location information, and the controller 200 may transmit the location information to the moving robot 1, and move the moving robot 1 to the particular area to set the particular area. The user's command also includes operation information, and the controller 200 may transmit the operation information to the moving robot 1 to perform operations. The controller 200 may transmit the particular area information to the moving robot 1 for collection of map building information of the territory. The controller 200 may receive a voice message to set at least one of a particular area or an operation, and set the at least one of the particular area or the operation. The controller 200 may transmit operation information of a plurality of particular areas so that the moving robot 1 may sequentially perform operations based on the location of the plurality of particular areas. The controller 200 may set a certain condition and a certain operation with respect to the territory according to a user's command, and transmit such condition and operation to the moving robot 1.

Figure 6:
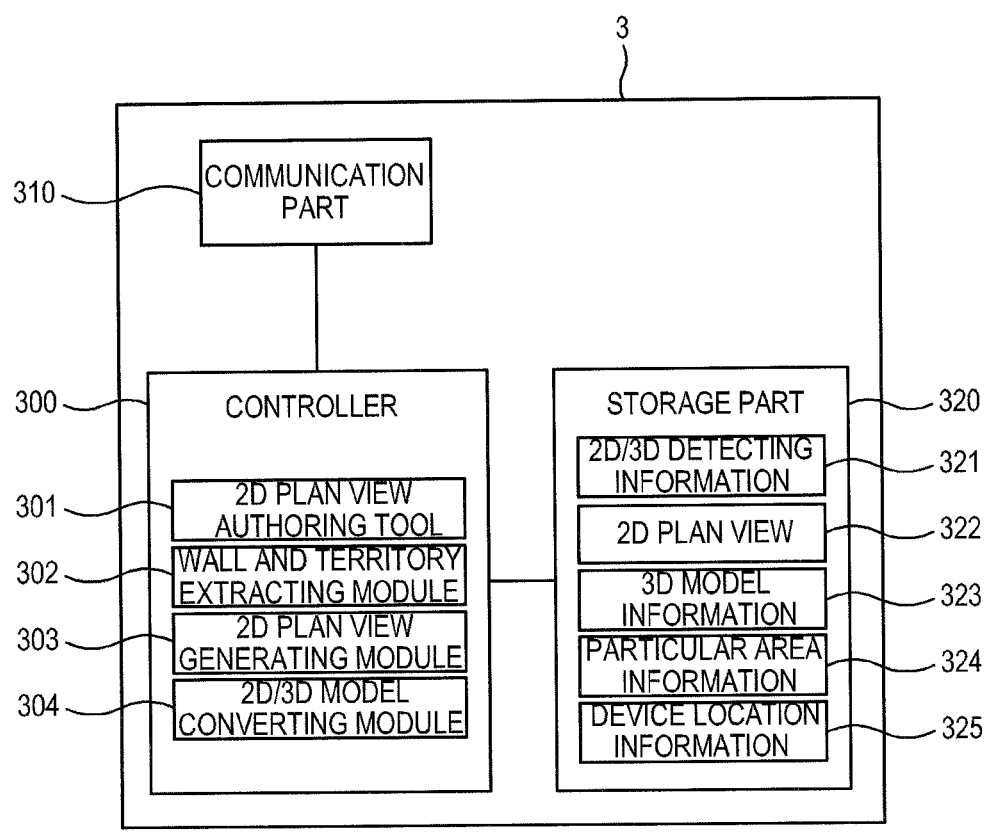
FIG. 6 is a block diagram of a cloud server according to an embodiment of the present disclosure.

FIG. 6 is a block diagram of a cloud server according to an embodiment of the present disclosure.

Referring to FIG. 6, the cloud server 3 may include a communication part 310, a storage part 320, and a controller 300.

The communication part 310 may receive signals from an external input. The communication part 310 may receive various wireless signals according to certain wireless communication specifications.

The communication part 310 may further include various additional elements, such as a wireless communication module (not shown) for wireless communication or a tuner (not shown) for turning a broadcasting signal, depending on a design type of the cloud server 3 as well as an element for receiving signals/data from an external input. The communication part 310 may transmit information/data/signals of the cloud server 3 to an external device as well as receiving signals from an external device. For example, the communication part 310 is not limited to the element for receiving signals from an external device, and may be implemented as an interface for interactive communication. The communication part 310 may receive a control signal from a plurality of control devices to select a UI. The communication part 310 may be provided as a communication module for known wireless local area communication, such as Wi-Fi, Bluetooth, IR, UWB, Zigbee, and the like, or as a mobile communication module, such as 3G, 4G, or LTE, or as a known communication port for a wired communication. The communication part 310 may be used for various purposes including inputting commands for manipulating display and transmitting and receiving data as well as inputting a control signal to select a UI.

The storage part 320 may be provided as a writable ROM to have data remain therein even upon cut-off of power to the cloud server 3 and to reflect changes made by a user. For example, the storage part 320 may be provided as one of a flash memory, an EPROM, an EEPROM, and the like.

The storage part 320 may automatically store therein detection data of a detector (not shown) and map information by a control of the controller 300. The storage part 320 may store therein information of conditions and operations which have been set by a manufacturer and a user. The storage part 320 may store particular area information 324, 2D/3D detecting information 321 detected by the detector 120 of the moving robot 1, a 2D plan view 322, 3D model information 323, and device location information 325, in each area by a control of the controller 300.

The controller 300 may include a 2D plan view authoring tool 301, a wall and territory extracting module 302, a 2D plan view generating module 303 and a 2D-3D model converting module 304. The controller 300 may generate and store map information and transmit and share such map information to/with the user terminal apparatus 2 and the moving robot 1 through the 2D plan view authoring tool 301, the wall and territory extracting module 302, the 2D plan view generating module 303, and the 2D-3D model converting module 304 based on map building information provided by the moving robot 1.

Figure 7:
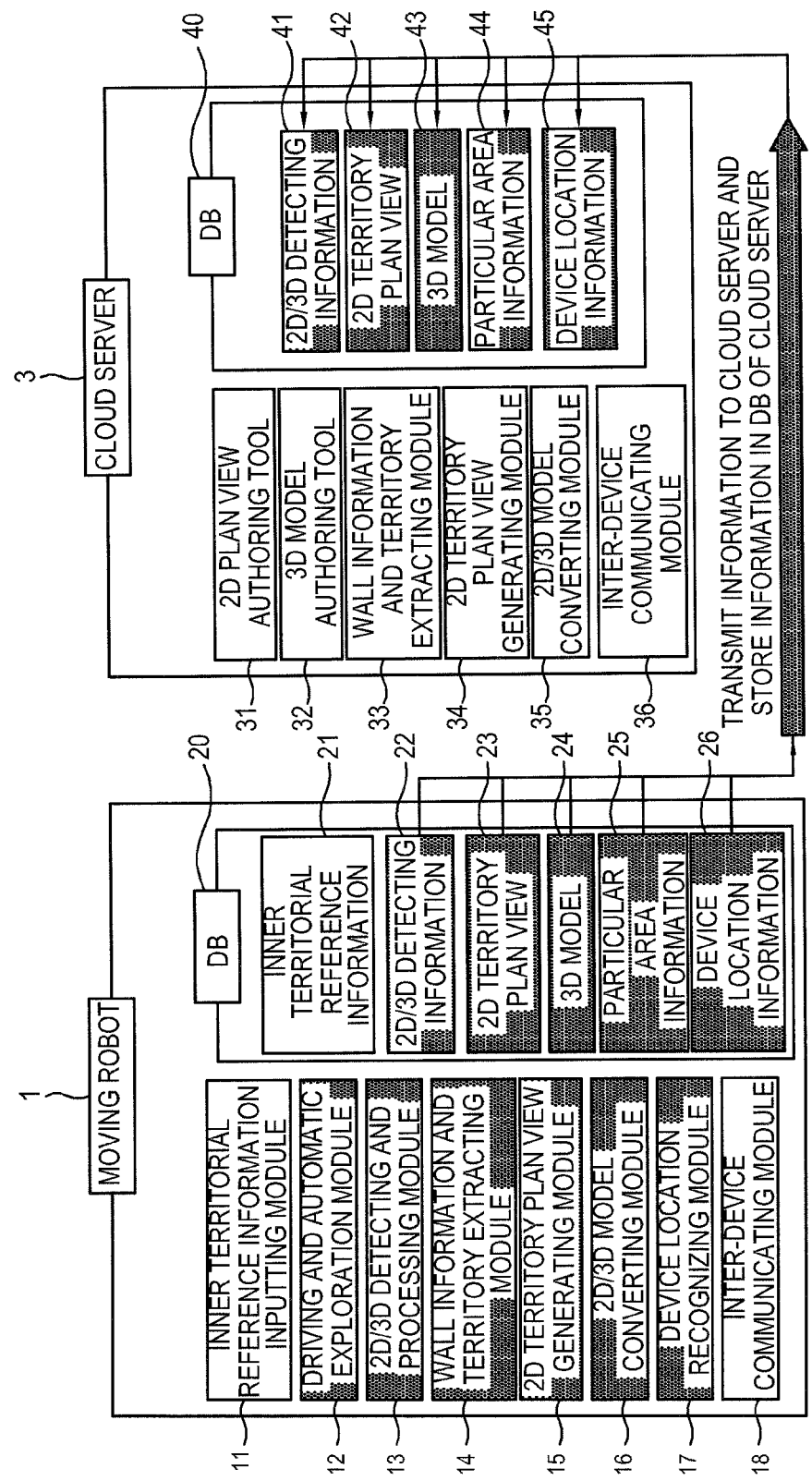
FIG. 7 illustrates a method of generating a two-Dimensional (2D) plan view and a three-dimensional (3D) model by a moving robot according to an embodiment of the present disclosure.

FIG. 7 illustrates a method of generating a 2D plan view and a 3D model by a moving robot according to an embodiment of the present disclosure. An example of generating a 2D plan view and a 3D module by the moving robot 1 in a user's territory (home) will be described. Modules may be separately provided or included in the controller.

Referring to FIG. 7, software modules of the moving robot 1 are illustrated. Functional modules are provided to generate a map of the territory through the moving robot 1. A driving and automatic exploration module is also provided in the moving robot 1. Information which is generated by respective functional modules is formed as a DataBase (DB) (20 and 40 of the moving robot 1 and cloud server 3, respectively). An inter-device communication module (18 and 36 of the moving robot 1 and cloud server 3, respectively) is provided to transmit and share information as DB between the cloud server 3 and the user terminal apparatus 2. Depending on processing capabilities of the moving robot 1, a wall information and territory extracting module 14, a 2D territory plan view generating module 15, and a 2D-3D model converting module 16 may be provided in the cloud server 3. In this case, the moving robot 1 may obtain 2D/3D detecting information 22 and device location information 26 through a 2D/3D detecting and processing module 13 and a device location recognizing module 17 and transmit the 2D/3D detecting information 22 and device location information 26 to the cloud server 3.

FIG. 7 also illustrates SW modules of the cloud server 3. The cloud server 3 may receive 2D/3D detecting information 41, a 2D territory plan view 42, a 3D module 43, particular area information 44, and device location information 45 from the moving robot 1. Even if the moving robot 1 transmits the 2D/3D detecting information 22 and device location information 26 to the cloud server 3, the cloud server 3 may generate the 2D territory plan view 42, the 3D module 43, and particular area information 44 through a wall information and territory extracting module 33, a 2D territory plan view generating module 34, and a 2D-3D model converting module 35, and transmit the generated 2D territory plan view 42, the 3D module 43, and the particular area information 44 to the moving robot 1 and share such information therewith.

FIG. 7 illustrates the moving robot 1 which includes the wall information and territory extracting module 14, the 2D territory plan view generating module 15, the 2D-3D model converting module 16, and the device location recognizing module 17 in addition to an automatic exploration module 12 and the 2D/3D detecting and processing module 13, and generates a map of the territory. For example, the moving robot 1 generates the 2D/3D detecting information 22, a 2D territory plan view 23, 3D model information 24, particular area information 25, and the device location information 26 and transmits the information to the cloud server 3 connected to the moving robot 1 through a network to store such information as a DB. Thereafter, a user may modify the information stored as the DB in the cloud server 3 through a 2D plan view authoring tool 31 and a 3D model authoring tool 32. A user may modify the 2D territory plan view 42 through the 2D plan view authoring tool 31, and modify the 3D model information 43 and particular area information 44 through the 3D model authoring tool 32. Out of the shared information, the 2D/3D detecting information 41 may be used to modify the 2D territory plan view 42 and 3D model 43 by overlapping and visualizing the plan view 42 and 3D model 43. The device location information 45 may be visualized by the 3D model authoring tool 32 together with the 3D model 43 for a user to identify the environment and structures within the territory, and may be used to form the 3D environment of the territory by adding the structures of the territory to the automatically generated/established 3D model 43. The map information is automatically generated. Respective areas of the territory are initially named Room_1, Room_2 and Room_3 to be distinguished by the system, and may be renamed as "Chul-soo's room", "Young-hee's room", and the like, by the authoring tool of the cloud server 3 or the particular area setting module 203 of the user terminal apparatus 2. For example, the particular areas may have aliases to be used to control the moving robot 1 by a user. For example, the respective areas may be mapped as {'Chul-soo's room': Room_1}, {'Young-hee's room': Room_2}, and {'Living room': Room_3}.

Inner territorial reference information may be used when the moving robot 1 automatically explores the territory. Inner territorial reference information 11, which has been directly input through the voice interface of the moving robot 1, may be transmitted to, and stored in, the user terminal apparatus 2 and allow a user to determine/modify inner territorial reference information 21 with the user terminal apparatus 2 when the moving robot 1 is connected to the user terminal apparatus 2.

Figure 8:
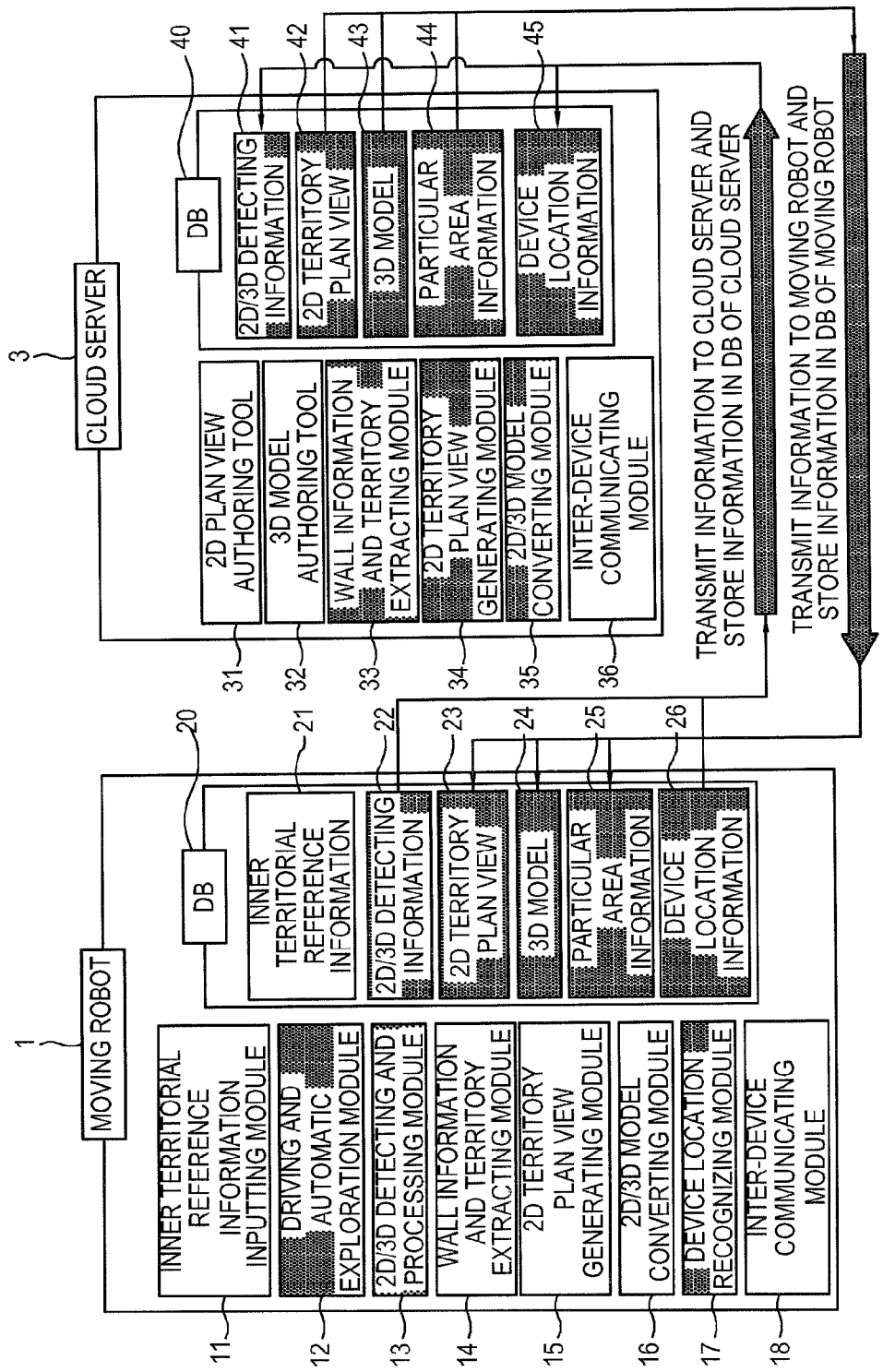
FIG. 8 illustrates a method of generating a 2D plan view and a 3D model by a cloud server according to an embodiment of the present disclosure.

FIG. 8 illustrates a method of generating a 2D plan view and a 3D module by a cloud server according to an embodiment of the present disclosure.

Referring to FIG. 8, it illustrates the cloud server 3 which generates a 2D plan view and a 3D model. For example, the moving robot 1 includes an automatic territory exploring module 12, a 2D/3D detecting and processing module 13, and a device location recognizing module 17, excluding the wall information and territory extracting module 14 and 2D-3D model converting module 16 due to its processing capabilities. Accordingly, the moving robot 1 detects the environment of the territory, recognizes location of devices, extracts the 2D/3D detecting information 22 and device location information 26 and transmits the information to the cloud server 3 through a network to store the information as a DB (20 and 40 of the moving robot 1 and cloud server 3, respectively). Thereafter, the cloud server 3 utilizes the received 2D/3D detecting information 41 and device location information 45, and automatically generates the 2D territory plan view 42, 3D model information 43 and particular area information 44 through the wall information and territory extracting module 33, 2D territory plan view generating module 34 and 2D-3D model converting module 35 of the cloud server 3 and transmits the plan view 42 and the 3D model information 43 and particular area information 44 to the moving robot 1 to store as a DB. The information, which has been transmitted to the moving robot 1, may be transmitted to the user terminal apparatus 2 when the user terminal apparatus 2 is connected to the moving robot 1. The moving robot 1 may use the 2D territory plan view 23 and the particular area information 25 transmitted by the cloud server 3 to automatically explore the territory. The particular area information 44, which have been automatically generated by the cloud server 3, may be named as Room_1 or Room_2 as designed by the system.

Figure 9:
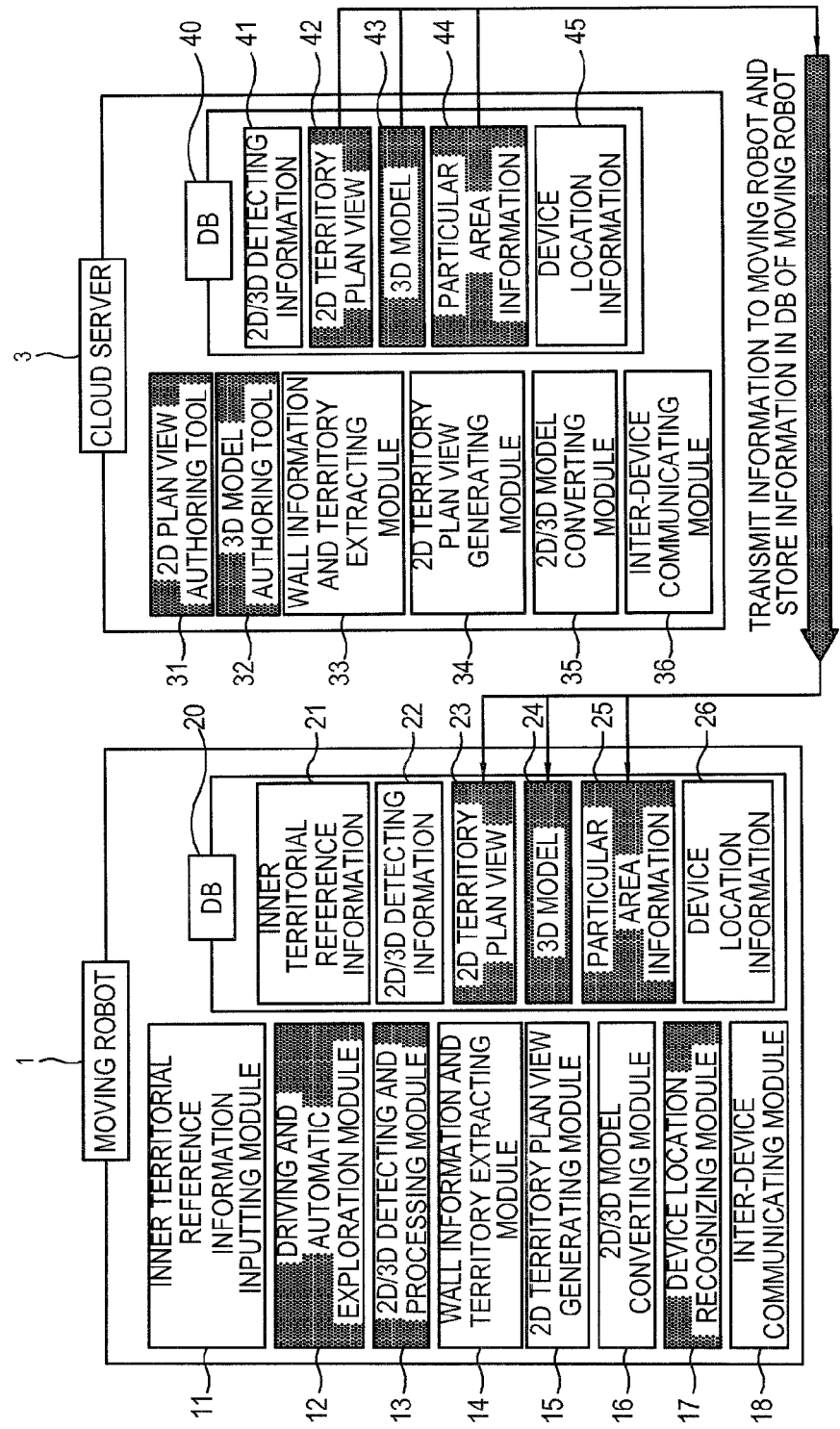
FIG. 9 illustrates a method of modifying, by an authoring tool, a 2D plan view and a 3D model which have been generated by a cloud server according to an embodiment of the present disclosure.

FIG. 9 illustrates a method of modifying, by an authoring tool, a 2D plan view and a 3D model which have been generated by a cloud server according to an embodiment of the present disclosure.

Referring to FIG. 9, a case where a user modifies/generates the generated 2D territory plan view 42, the 3D model 43, and the particular area information 44 in the cloud server 3 is illustrated. A user may modify the generated map information by using the 2D plan view authoring tool 31 and the 3D model authoring tool 32 of the cloud server 3. For example, if the information, which has been automatically generated by the moving robot 1 or cloud server 3, is different from the actual environment of the territory or should be added with other information, a user may modify/supplement the 2D territory plan view 42 and the 3D model 43 by using the authoring tool. A user may add an alias to the names of the particular area information 44, such as Room_1 and Room_2, which have been automatically named by the system. For example, a user may use his/her name to map the particular area information 44 as {'Chul-soo's room': Room_1} and {'Young-hee's room': Room_2}. A user may generate new particular area information 44 on a map by drawing a line on the map to divide the territory or draw a polygon to newly designate a territory. The straight-lined or polygonal area may be set as a non-access area or a non-cleaning area which the moving robot 1 is not allowed to enter while exploring the territory.

Accordingly, a user may make a virtual wall or space which does not exist in reality. For example, a straight line is recognized as a virtual wall, and may be expressed as {(x1, y1), (x2, y2)}. The polygon is recognized as a space designed by a user, and defined as {(x1, y1), (x2, y2), (x3, y3), . . . }, and a name of a particular area and a non-access area may be set.

The information which has been modified/generated by a user from the cloud server 3 may be transmitted to and stored in the moving robot 1 and used for the user terminal apparatus 2 when the user terminal apparatus 2 is connected to the moving robot 1. The particular area information, such as the virtual wall and non-access area, which has been newly generated by a user may be recognized as obstacle information and used to prevent the moving robot 1 from going over or entering the particular area when the moving robot 1 automatically explores the territory. This may be replaced by a physical stopper (i.e., a tape, a virtual wall sensor, and the like) used by existing cleaning robots.

Figure 10:
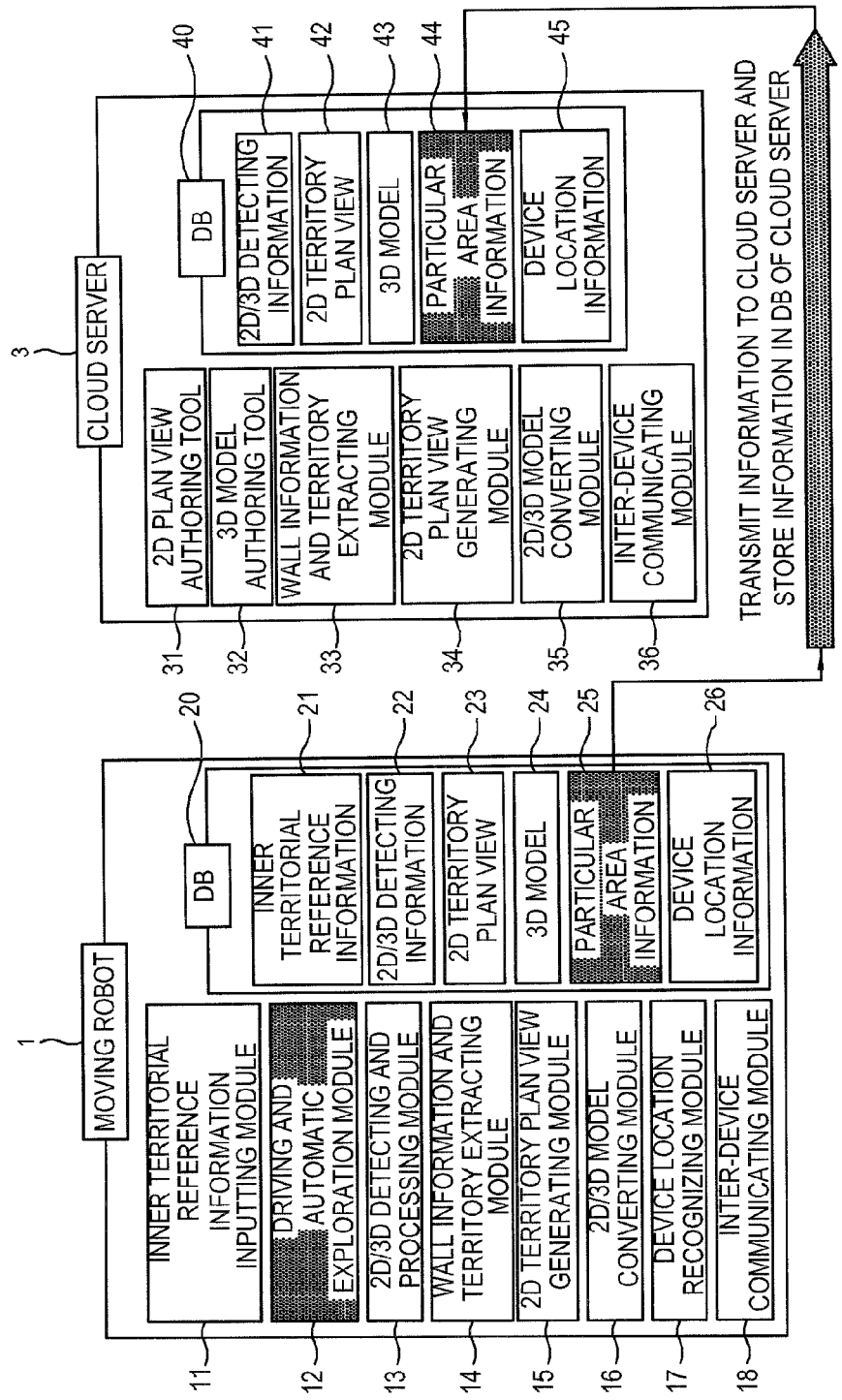
FIGS. 10, 11, and 12 illustrate a method of setting specific territorial information by a moving robot, a cloud server, and a user terminal apparatus according to an embodiment of the present disclosure.

FIG. 10 illustrates a method of setting particular area information by a moving robot according to an embodiment of the present disclosure.

Referring to FIG. 10, a case where the moving robot 1 names a particular area will be explained. First, a user manipulates the moving robot 1 and moves the moving robot 1 to a particular location within the territory. Thereafter, a user may name the location through Q&A by using a voice interface from the particular location. The name is set in coordinates (x, y) of the particular location, and if there is an existing map and the location is separately classified as a particular location, the name is also set in the existing territorial information. For example, if a user names the coordinates (x, y) as 'Chul-soo's room', and there is particular area information {(x1, y1), (x2, y2), (x3, y3) . . . }, the existing particular area is named identically. To set the particular area information of the moving robot 1, the moving robot 1 should move to the particular location. The moving robot 1 may be moved to the particular location following a user's command through voice recognition and gesture recognition. For example, a user may give a voice command, such as "Come here!", and use a waving gesture, and when the moving robot 1 reaches the particular location, the user may name the location through Q&A of the voice interface.

Figure 11:
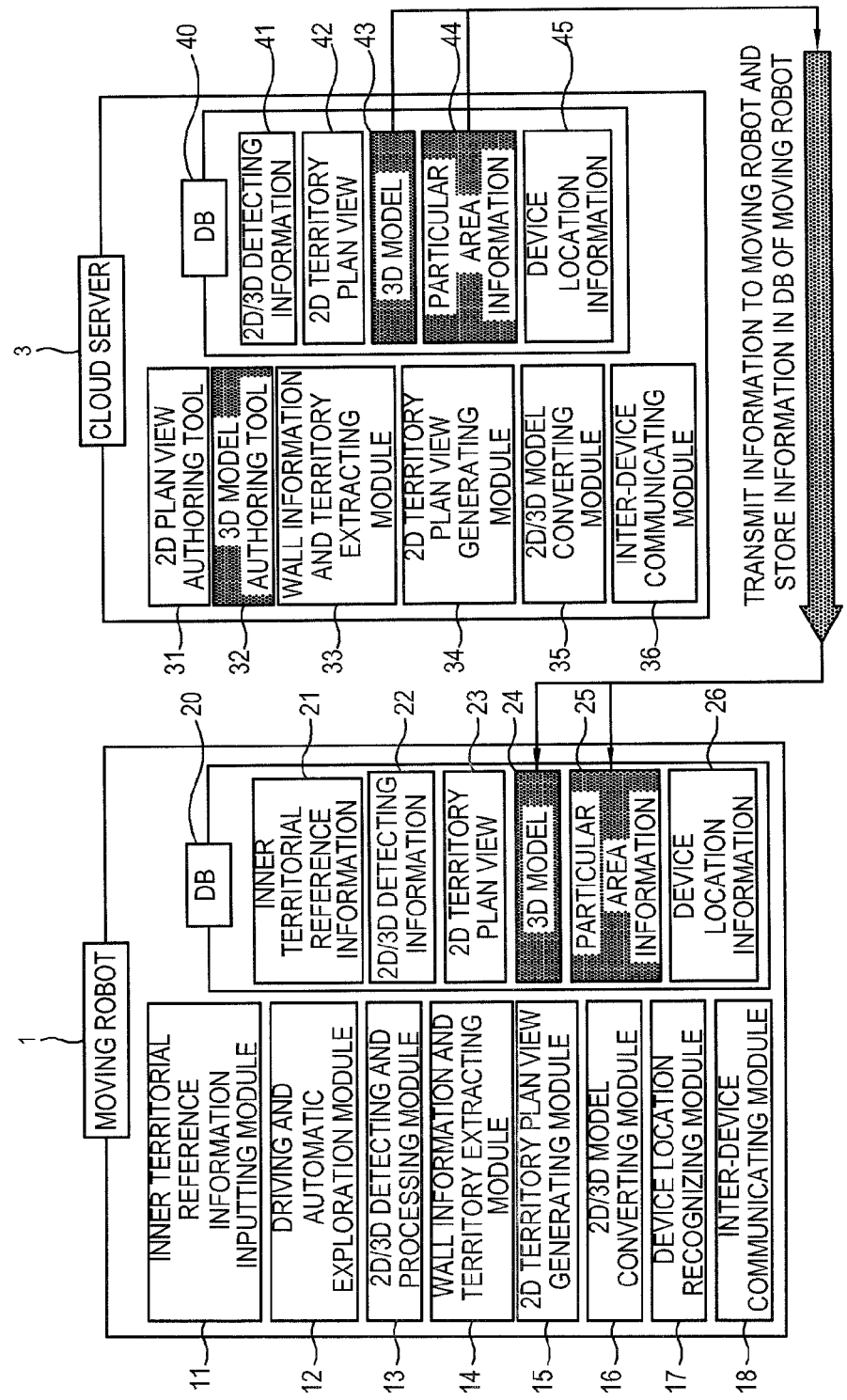

FIG. 11 illustrates a method of setting particular area information by a cloud server according to an embodiment of the present disclosure.

Referring to FIG. 11, it illustrates a case where particular area information is set in the cloud server 3. If the cloud server 3 stores therein an automatically generated map as a 3D model 43, and there is particular area information 44 which has been automatically classified, in the 3D model 43, a user may set the particular area information 44 with respect to the classified area by using the 3D model authoring tool 32. For example, a user may name the area as 'Chul-soo's room', or "Young-hee's room' to be used easily. A user may additionally designate a particular area and set the particular area as needed in addition to the automatically classified particular area. A user may set a particular area, e.g., 'in font of TV' with respect to a location and name the location as 'in front of TV' to control the moving robot 1. For example, a user may give an intuitive command, such as 'go to the front of TV', to the moving robot 1. A user may designate a new particular area, set a virtual wall, and designate a non-access or non-cleaning area not to allow the moving robot 1 to enter the area.

The particular area information 44, which has been modified by a user from the cloud server 3 for the foregoing purpose, may be transmitted to/stored in the moving robot 1 and used to control the moving robot 1. More particularly, if the virtual wall is set, the particular area may be recognized as a non-access area by the moving robot 1.

Figure 12:
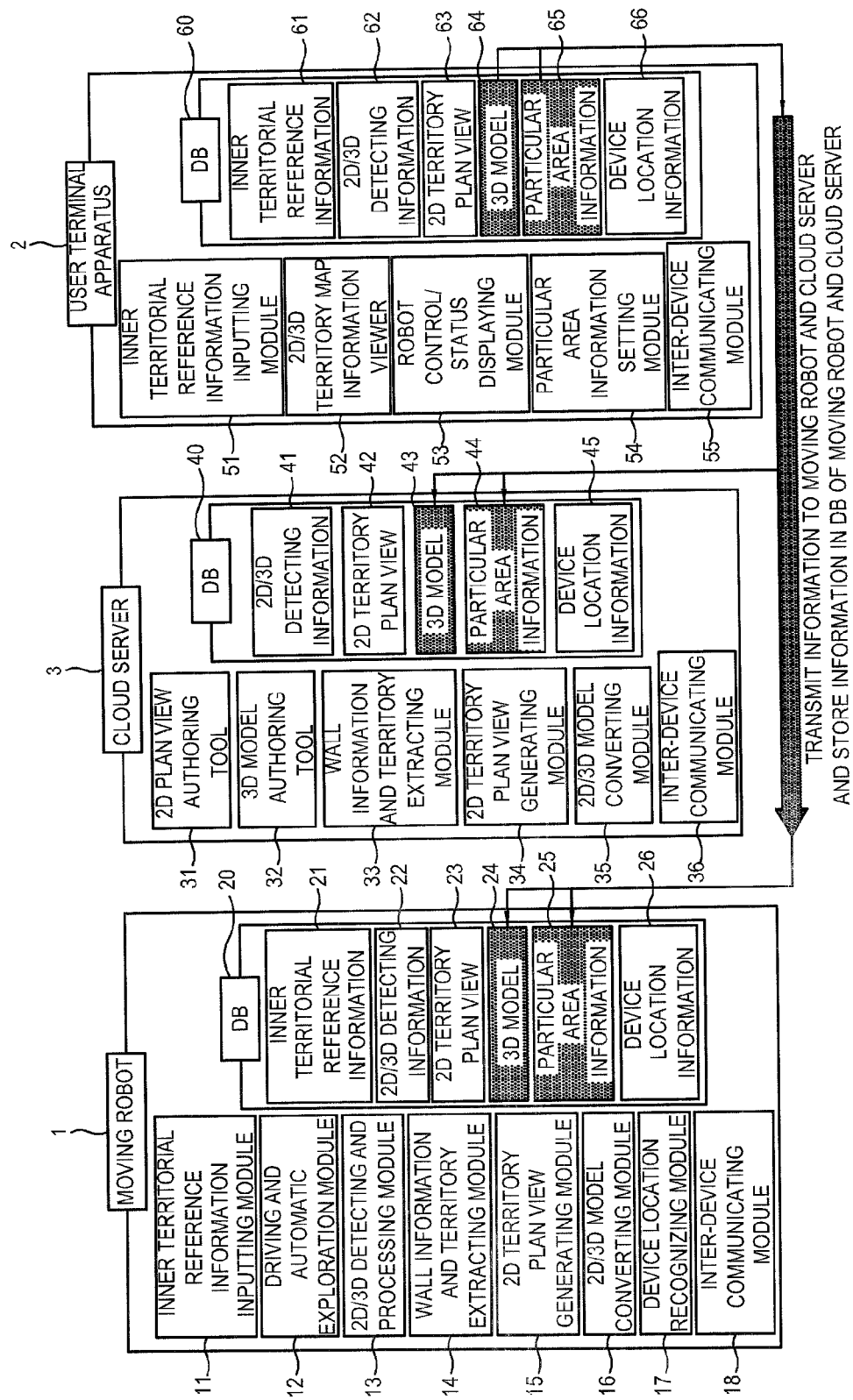

FIG. 12 illustrates a method of setting particular area information by a user terminal apparatus according to an embodiment of the present disclosure.

Referring to FIG. 12, a case where particular area information is set in the user terminal apparatus 2 is illustrated. From a list of inner territorial reference information 61, 2D/3D detecting information 62, a 2D territory plan view 63, a 3D module 64, particular area information 65, and device location information 66 stored in DB 60, the user terminal apparatus 2 may transmit the 3D module 64 and the particular area information 65 to the cloud server 3 and the moving robot 1 and store information in DB 40 and 20 of the cloud server 3 and the moving robot 1, respectively. The user terminal apparatus 2 may include an inner territorial reference information inputting module 51, a 2D/3D territory map information viewer 52, a robot control/status displaying module 53, a particular area information setting module 54, and an inter-device communicating module 55. The user terminal apparatus 2 may display a map which has been generated by the 2D/3D interior map viewer 52, and a user may newly set a particular area or name the existing area on the existing map to set the particular area information 65 through the particular area information setting module 54. Similarly, a user may set a new particular area as a non-access or non-cleaning area. The particular area information 65, which has been generated/modified by the user terminal apparatus 2, is transmitted to and stored in the cloud server 3 and the moving robot 1, and the moving robot 1 may use virtual wall information when moving around the territory.

Figure 13:
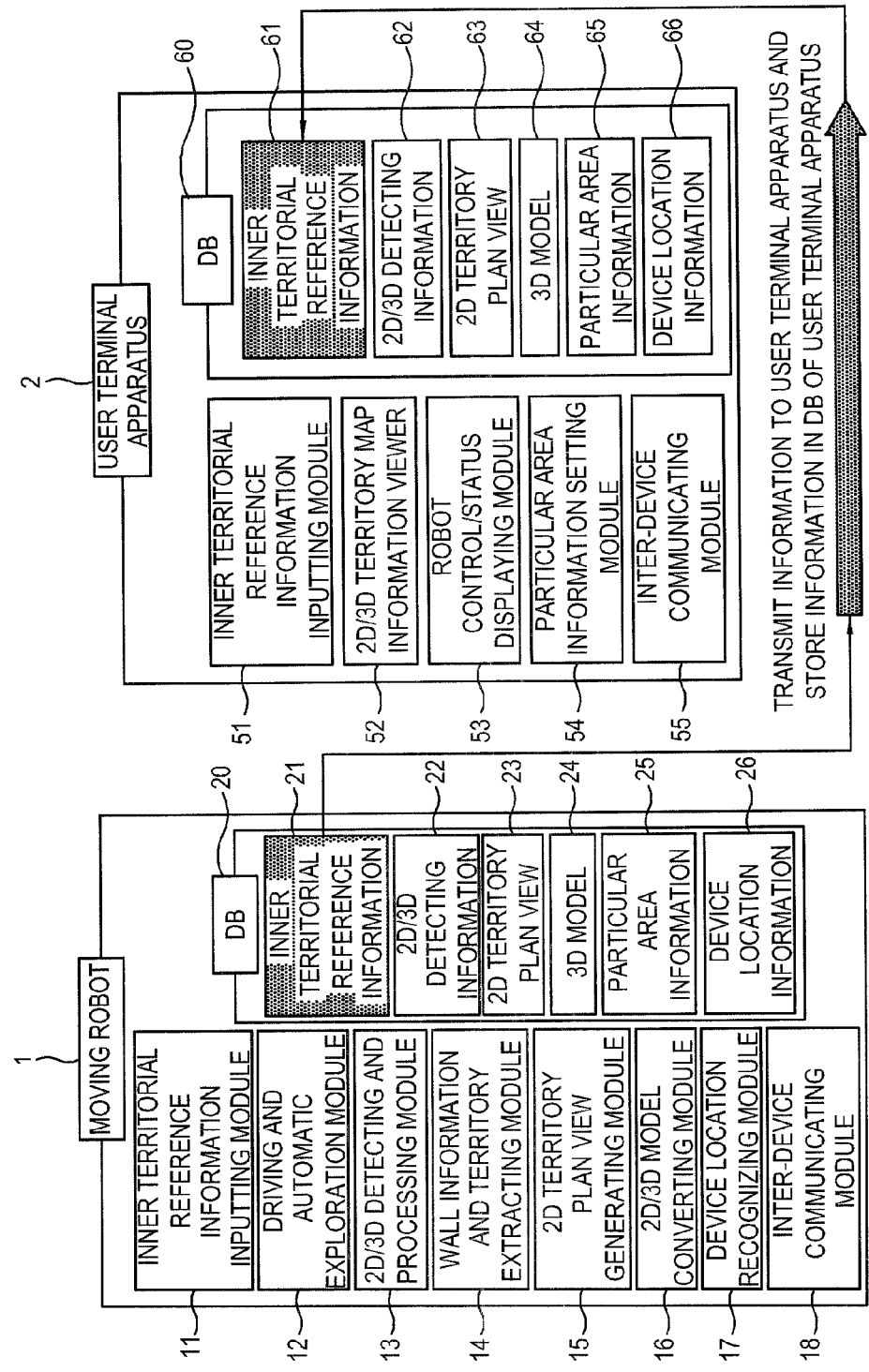
FIGS. 13 and 14 illustrate a method of inputting territorial reference information to a moving robot and a user terminal apparatus according to an embodiment of the present disclosure.

FIG. 13 illustrates a method of inputting territorial reference information to a moving robot according to an embodiment of the present disclosure.

Referring to FIG. 13, a case where a user purchases the moving robot 1 and inputs advance territorial reference information 21 of structures and environment of the territory to the moving robot 1 to use the information within the territory is illustrated. The moving robot 1 may include a voice recognition interface, and the like. For example, a user inputs particular area information 25, device location information 26 and wireless network AP information as the advance territorial reference information 21 through Q&A of the voice interface. For example, if a user executes a mode for the territorial reference information 21 in the moving robot 1, the moving robot 1 may obtain information, such as "How many rooms are there at your home?", "How many TVs do you have at your home?", or "Is there any wireless AP at your home?" by voice. The inner territorial reference information may be used when the moving robot 1 automatically explores the territory. If there is no information during the automatic exploration of the territory by the moving robot 1, it cannot be determined whether the exploration results are accurate or whether the entire territory has been explored. However, if the particular area is automatically recognized through the wall extracting and area classifying functions after the moving robot 1 completes the automatic exploration of the territory, a user may compare the results with the territorial reference information 21 that has been input in advance, and may determine whether to additionally explore the territory in the future.

The inner territorial reference information 21 which has been directly input through the voice interface of the moving robot 1 may be transmitted to, and stored in, the user terminal apparatus 2 and allow a user to determine/modify the territorial reference information 21 with the user terminal apparatus 2 when the moving robot 1 is connected to the user terminal apparatus 2.

Figure 14:
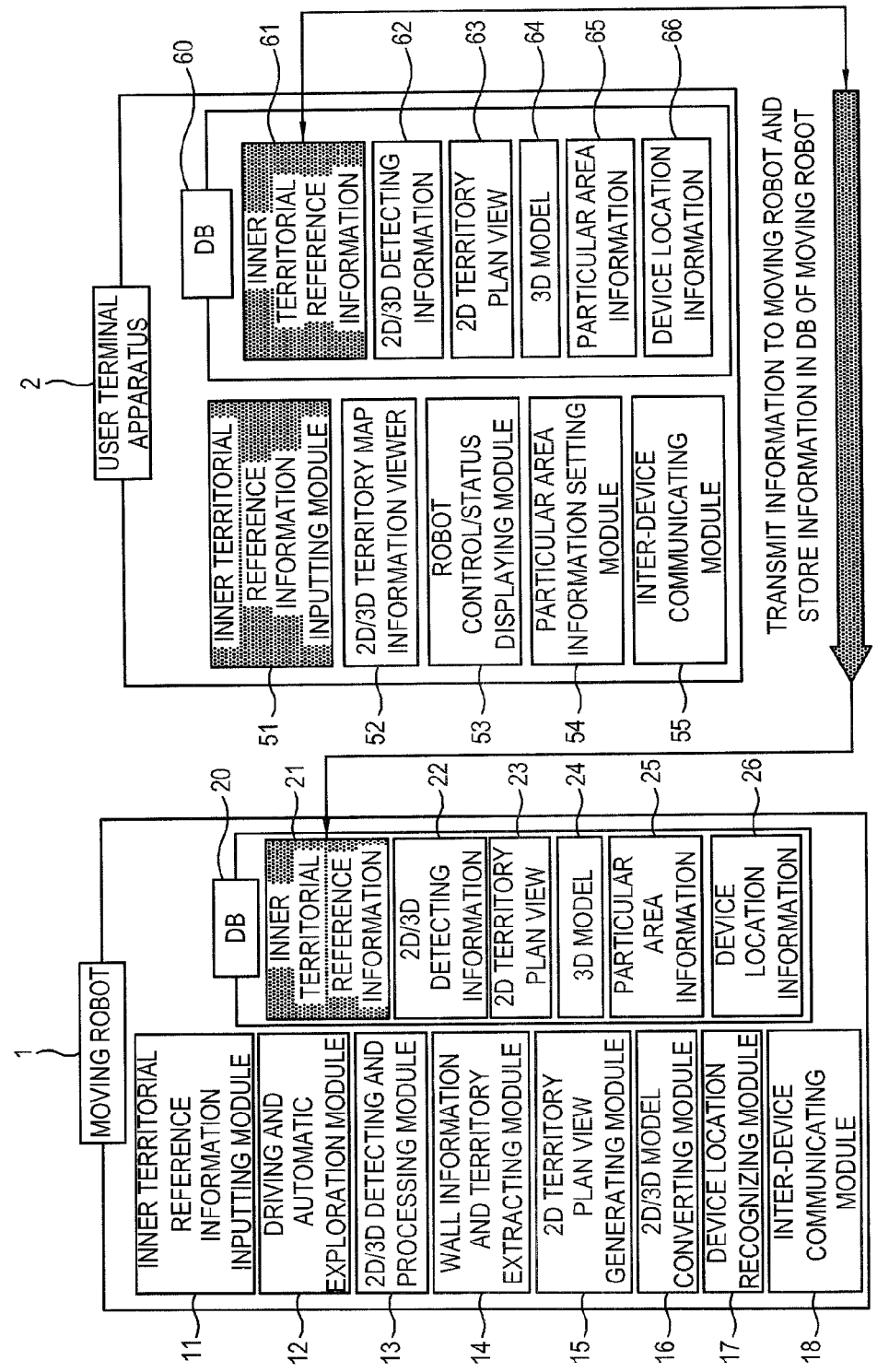

FIG. 14 illustrates a method of inputting territorial reference information to a user terminal apparatus according to an embodiment of the present disclosure.

Referring to FIG. 14, a case whether inner territorial reference information 61 is input to the user terminal apparatus 2 is illustrated. The user terminal apparatus 2 may display the territorial reference information 61, which has been input in advance, through not only voice interface but also a GUI and allow a user to modify/add information. The territorial reference information 61, which has been input to/modified in the user terminal apparatus 2, may be transmitted to/stored in the moving root 1 to be used when the moving robot 1 explores the territory.

Figure 15:
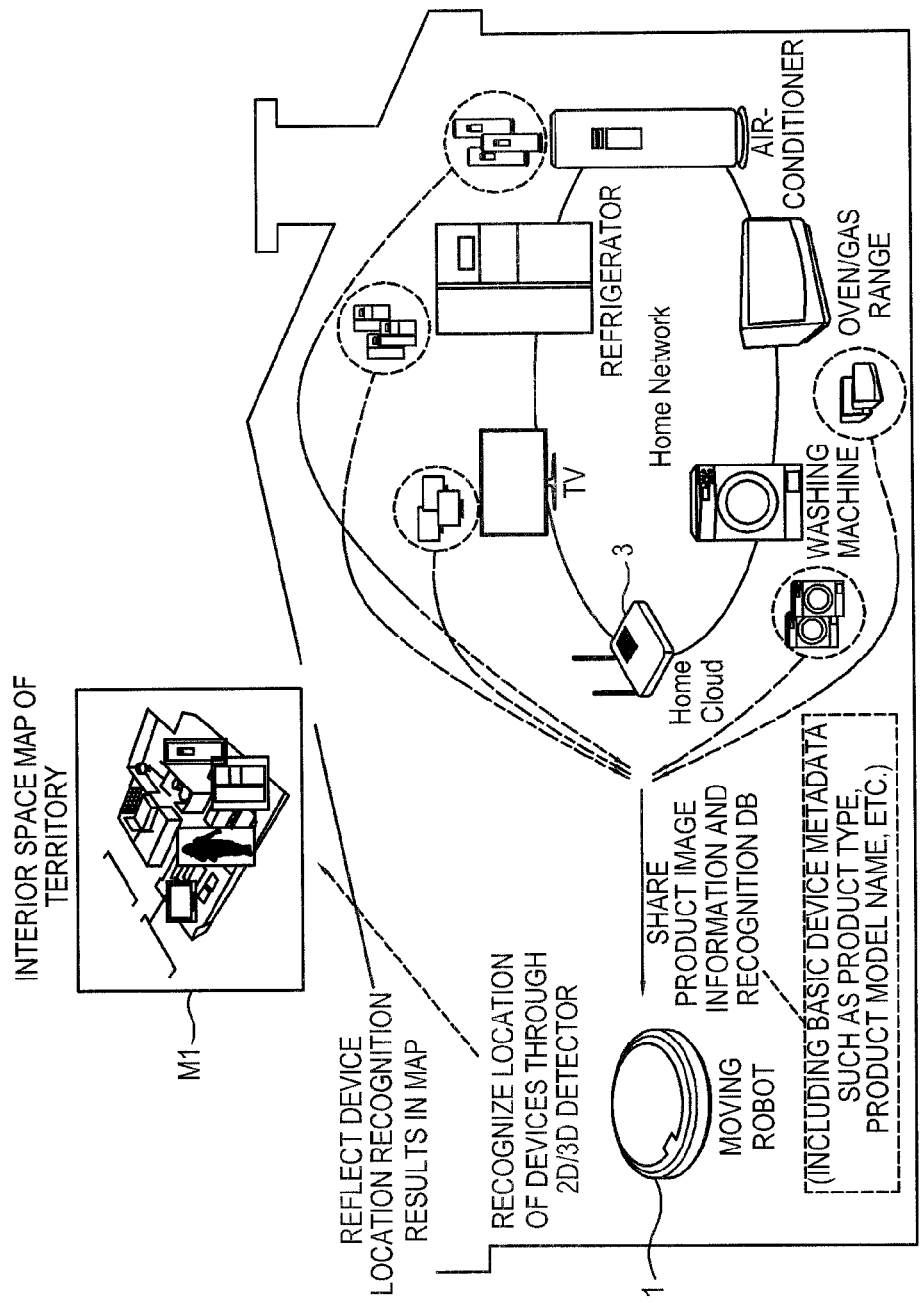
FIG. 15 illustrates a method of setting location information using device metadata for recognizing location of devices within a territory by a moving robot according to an embodiment of the present disclosure.

FIG. 15 illustrates a method of setting location information by using device metadata for recognizing a location of a device by a moving robot in a particular area according to an embodiment of the present disclosure.

Referring to FIG. 15, a case where devices in a particular area connected to a home network have a product image as device metadata and share such image with other devices within the home network, and the moving robot 1 utilizes the device metadata and recognizes devices in the particular area through its 2D/3D sensor, identifies the location of the devices, and sets device location information in an interior space map M1 of the particular area generated by the moving robot 1 is illustrated. The devices in the particular area may have not only basic device metadata, such as a type and a model name of products, but also (a plurality of) product images for recognizing objects through the 2D/3D sensor, a recognition DB, and scale information of the image against the actual size. For example, the devices may have all of the information as the device metadata for recognition.

The method for recognizing the location of the devices in the particular area using the device metadata and the moving robot 1 may be used to automate the process of setting the location of the device in the system which is conducted by an installer to ensure location-based control when the control system is initially set in a particular area through the existing home network.

Control of the devices including the moving robot 1 through the particular area information defined in the interior space map M1, device location information and a voice recognition command may be implemented by sharing the voice recognition command. In the system in FIG. 1, smart devices connected to the home network in the territory in addition to the moving robot 1 may include their own voice recognition interface. However, if not all of devices includes the voice recognition interface, a voice recognition command which is recognized by a particular device may be used to control another device through the home network. For example, if a user gives a voice command, such as "Tango, come to the TV in the living room!" through the voice recognition interface of a smart TV, a voice recognition module may decide a device in the particular area to which the words "Tango," or "Come to ~!" may apply. In this case, the moving robot 1 is the device that may move to the particular location in the territory and thus, the voice recognition result is transmitted to the moving robot 1 through the home network, and the moving robot 1 may recognize the location of the "TV in the living room" on the interior space map M1 within the territory with respect to the word "TV in the living room" and may execute the command. As another example, if a user gives a voice command, such as "Turn on TV in the living room!" to the moving robot 1, the voice command is recognized as referring to the device "TV in the living room", and thus, the voice recognition result of the moving robot 1 may be transmitted to the "TV in the living room" which may execute the command.

Figure 16:
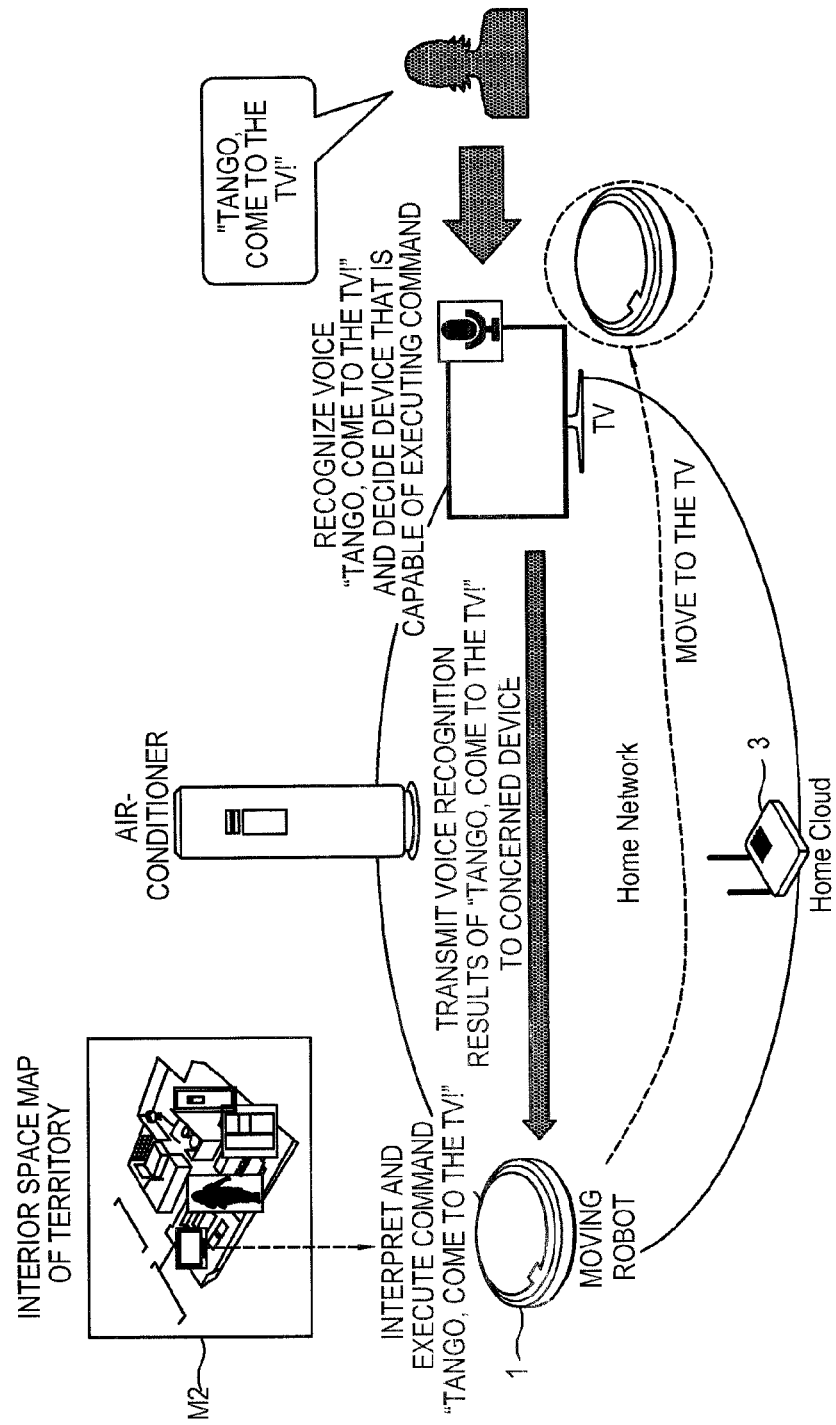
FIG. 16 illustrates a method for sharing a voice recognition command using a home network according to an embodiment of the present disclosure.

FIG. 16 illustrates a method of sharing a voice recognition command by using a home network according to an embodiment of the present disclosure.

Referring to FIG. 16, a method for sharing a voice recognition command using a smart home appliance connected to a home network is illustrated. For example, if a TV is capable of recognizing a voice, and a user gives a command "Tango, come to the TV!" to the TV, the voice recognition module of the TV converts the command into a text and finds a main keyword and a context related to the device therefrom. The TV may determine that the concerned device is the moving robot 1 based on the alias "Tango" and the operation information "come to ~!". For example, the TV should interpret the user's voice command to determine the concerned device. Thereafter, the TV transmits/shares the voice recognition result to/with the moving robot 1 as the concerned device. The moving robot 1 may determine that the word "to the TV" is the location context, and may move to the TV by referring to the location of the TV on the interior space map M2 of the home.

The foregoing method may apply to all devices which may recognize voice in the home network at home. For example, a user may give a command to control a TV, an oven/gas range, an air-conditioner, and the like, through a voice recognition interface of the moving robot 1.

FIGS. 17A, 17B, 17C, and 17D illustrate a method of a process of generating an interior space map of a territory by using a moving robot according to an embodiment of the present disclosure.

Figure 17A:
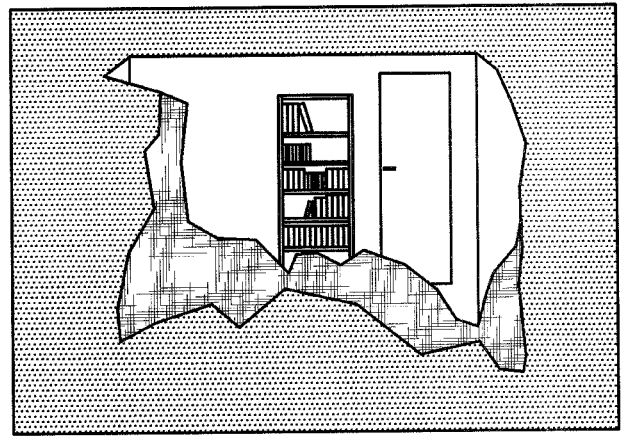
FIGS. 17A, 17B, 17C, and 17D illustrate a method of a process of generating an interior space map within a territory by using a moving robot according to an embodiment of the present disclosure.
Figure 17B:
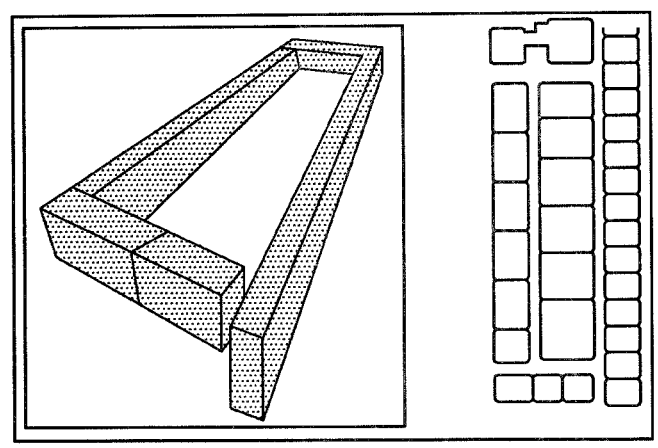
Figure 17C:
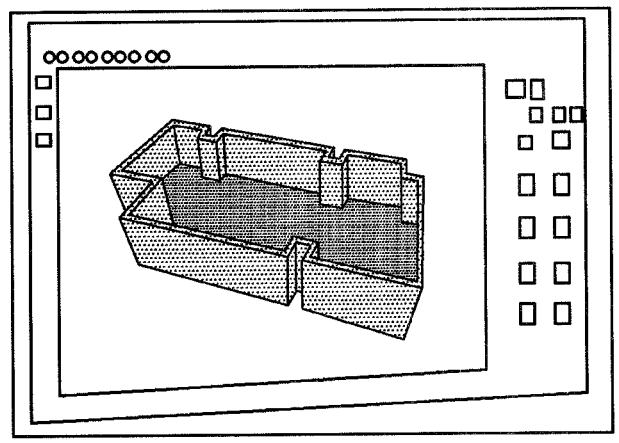
Figure 17D:
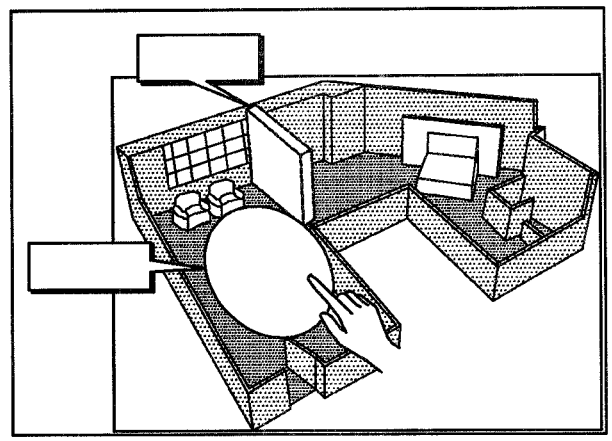

Referring to FIGS. 17A, 17B, 17C, and 17D, a process of generating an interior space map of the territory by using the moving robot 1 is illustrated. The process explained in FIG. 24 may be explained as follows if the process is actually performed. First, as illustrated in FIG. 17A, the moving robot 1 detects the environment of the territory through the 3D sensor, performs the 3D SLAM to obtain the 3D point cloud data/Octree data, and generates exploration trace information of the territory. As illustrated in FIG. 17B, if the moving robot 1 completes the exploration of the territory, it may reflect the 3D point cloud data in a 2D plane and generate a 2D plan view by using the obtained 3D point data and Octree data. As the 3D point cloud data have been obtained with respect to all of structures of the territory, the wall information is extracted therefrom to identify the structure of the territory. If the wall information is extracted, the territory is automatically classified based on the wall information. With respect to the automatically classified areas, the system generates particular area information, such as {Room_1: (x1, y1), (x2, y2)}. As illustrated in FIG. 17C, if the 2D plan view is automatically generated as above, the 3D model is automatically generated through the 2D-3D converting module. The automatically generated 3D model may be modified or added with other structures located at home (i.e., tables, chairs and other furniture and structures) by a user through an authoring tool. As illustrated in FIG. 17A, the generated map may be used to provide service through the moving robot 1. For example, a user may designate a cleaning area on the map and cause the moving robot 1 to clean the cleaning area, or may set a virtual wall to prevent the moving robot 1 from entering a particular area.

Figure 18:
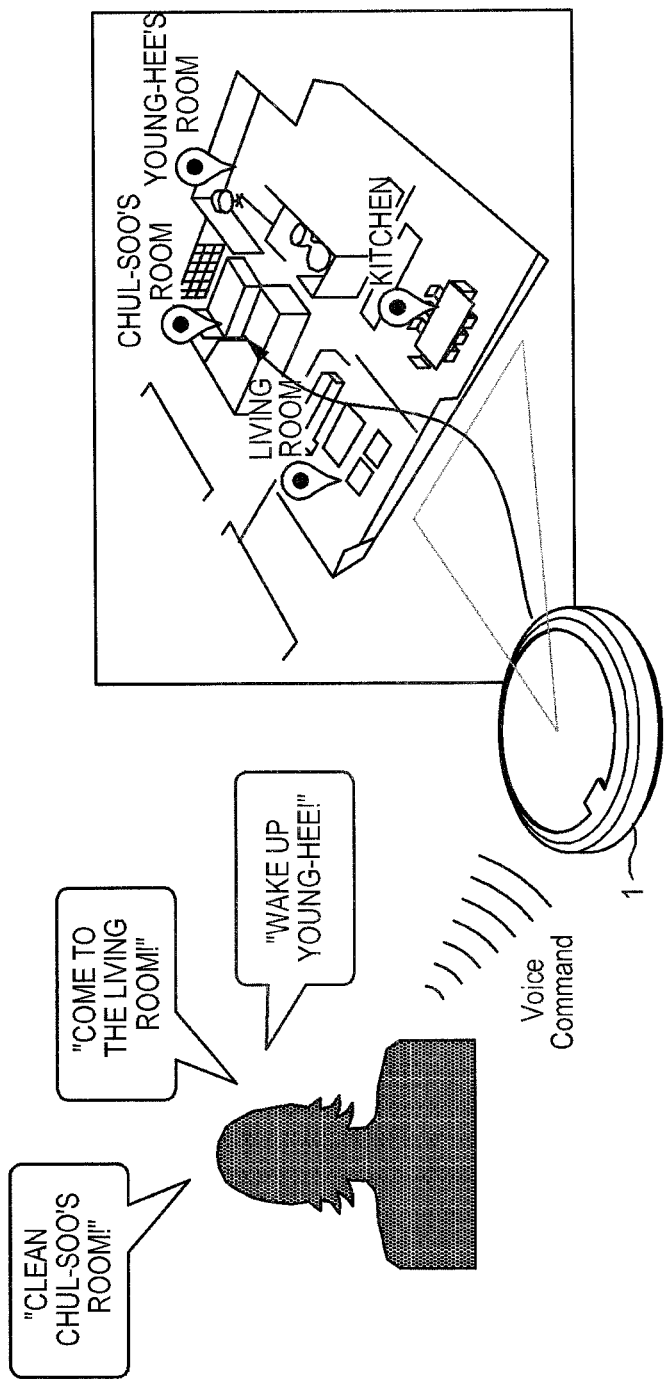

FIGS. 18 and 19 illustrate services using an interior space map of a territory according to another embodiment of the present disclosure.

Currently, cleaning robots perform an automatic cleaning function according to a user's command input through a remote controller or cleans a particular room where it is put in. However, the cleaning robots perform a simple cleaning operation and may not designate and clean a particular area.

Referring to FIGS. 18 and 19, the interior space map of the territory may be generated and the particular area information may be set in the map so that a user may give a command more easily. The moving robot 1 includes a voice recognition module, and a user may give a voice command to the moving robot 1 by using the particular area information. For example, a user may give voice commands, such as "Clean Chul-soo's room", "Come to the living room", or "Wake up Young-hee" as in FIG. 18 and the moving robot 1 may provide service according to the command. The map visualizes the home structure and at the same time has additional context, such as the particular area information and thus, may provide convenient service.

If a user desires to move the moving robot 1 to a particular location at home or to give a command to the moving robot 1 in a remote place by being connected to the moving robot 1, he/she may give a command in a more convenient manner than the manual manipulation through the existing image-based control as in FIG. 19. A user may transmit a voice command to a network from a remote place like controlling the moving robot 1 through his/her voice in the territory and give a command, such as "Clean Chul-soo's room!" Thereafter, the moving robot 1 may refer to the location of 'Chul-soo's room' on the interior space map of the territory and may move to the concerned location. As the user terminal apparatus 2 may visualize the interior space map of the territory, a user may select the particular area "Chul-soo's room' on the map, and select cleaning or other functions (i.e., an exploration of/movement to the territory, an alarm service, and the like) through a GUI.

The generated interior space map may visualize the environment of the territory through a 3D model to provide a user with a view of the structure and environment of the territory. Further, a user may set information of the space within the territory and execute location-based service by using the moving robot 1 on the interior space map.

For example, the moving robot 1 may move to a particular room in a particular area, and execute a command, such as security (remote monitoring), remote avatar (voice/video conversation), and morning call service.

Figure 20:
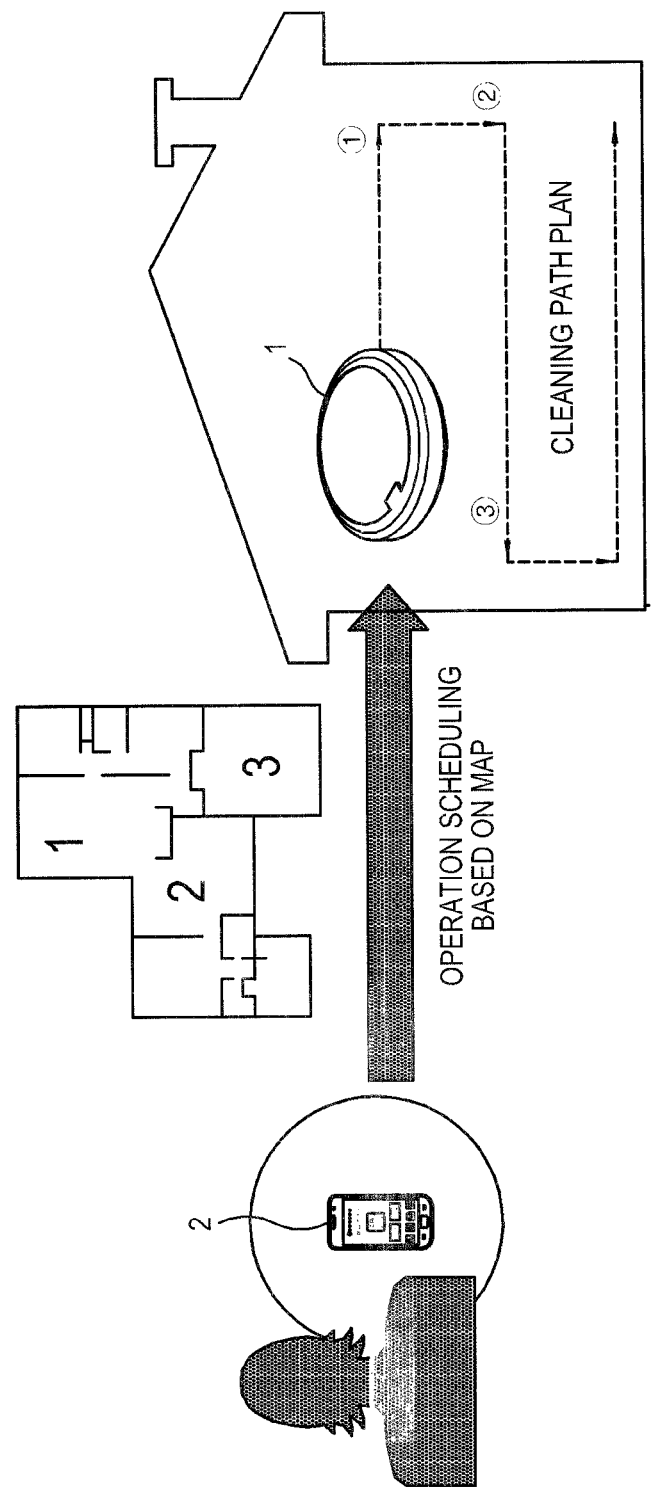
FIG. 20 illustrates a method of designating and cleaning a particular area and scheduling a command according to an embodiment of the present disclosure.

FIG. 20 illustrates a method of designating and cleaning a particular area and scheduling a command according to an embodiment of the present disclosure.

Referring to FIG. 20, designation and cleaning of a particular area in the territory and planning of execution of commands by utilizing the generated interior space map of the territory are illustrated. A user may sequentially select particular areas on the map and plan cleaning of rooms as in FIG. 20. For example, if a user decides the cleaning order in 1→2→3 as in FIG. 20, the moving robot 1 refers to the location information of the particular areas 1, 2 and 3, moves to the location of the particular area 1 for cleaning. Thereafter, the moving robot 1 may sequentially move to and clean the particular areas 2 and 3. This is different from the existing robots, which clean the location where they are located without classification of particular areas, in that a user may plan cleaning and execution of commands.

As another function, the moving robot 1 may perform a user's command for a plurality of particular areas for patrol when a user is absent. For example, when a user goes out, he/she may set the order of monitoring rooms and cause the moving robot 1 to regularly patrol the territory. If a preset condition occurs, the moving robot 1 may move to a particular area corresponding to the occurred condition and perform a preset operation. For example, if the moving robot 1 detects conditions, such as fire or smoke or darkening view while on patrol, it may move to a particular area and operate a sprinkler or alarming device in the particular area even without a user's command, or notify a user of the occurrence of the preset condition. For example, the moving robot 1 may protect assets of a user through the foregoing operation.

The moving robot 1 may perform an operation at the reserved time according to the reserved command of a user, and upon completion of the operation, may transmit a completion message to a user.

Figure 21:
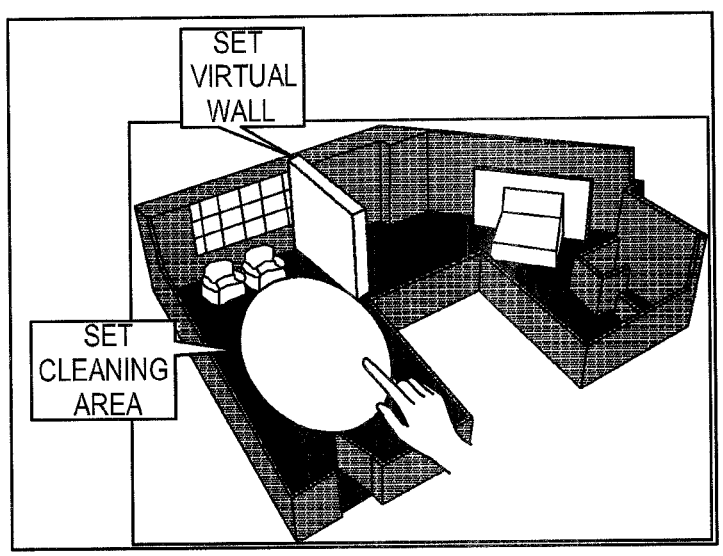
FIG. 21 illustrates a method of setting a virtual wall and a cleaning area on a map of a territory according to an embodiment of the present disclosure.

FIG. 21 illustrates a method of setting a virtual wall and a cleaning area in a map of a territory according to an embodiment of the present disclosure.

Referring to FIG. 21, it illustrates a method of setting a virtual wall or cleaning area by a user by using the generated interior space map of the territory.

The virtual wall is set by a user in a particular location on a 3D model and prevents the moving robot 1 from entering the particular location while moving. The virtual wall may be set as a wall or area.

If the virtual area is set, a user may give a command for the moving robot 1 to clean the area.

Commands, such as "Come to ~!" and "Come to the living room!", as explained in FIG. 18, are given for the moving robot 1 to go to a user's location according to a user's call. This is called Call & Come function, and the moving robot 1 should identify the user's location to perform the Call & Come function.

The user's location may be obtained from the map on which a particular are and location of the devices is set. Accordingly, if a command, such as "Come to the living room!", is given, the moving robot 1 may move to the concerned location by using the location information. The command, such as "Come to the TV!", may be executed based on the location information of the TV on the map.

As another example, the moving robot 1 may move to the user's location according to a simple command, such as "Come here." This has been explained in the part "sharing of voice recognition information using home network" in FIG. 16. For example, as a user may identify the device in the territory used to give a voice command, the moving robot 1 may refer to the location of the concerned device and move to the user's location.

To apply the Call & Come function to a cleaning robot, the command "Come here" may be used to move the cleaning robot to the user's location, and the voice "Clean" and a gesture indicating the particular area with a hand may be used for the moving robot 1 to perform spot cleaning.

Figure 22:
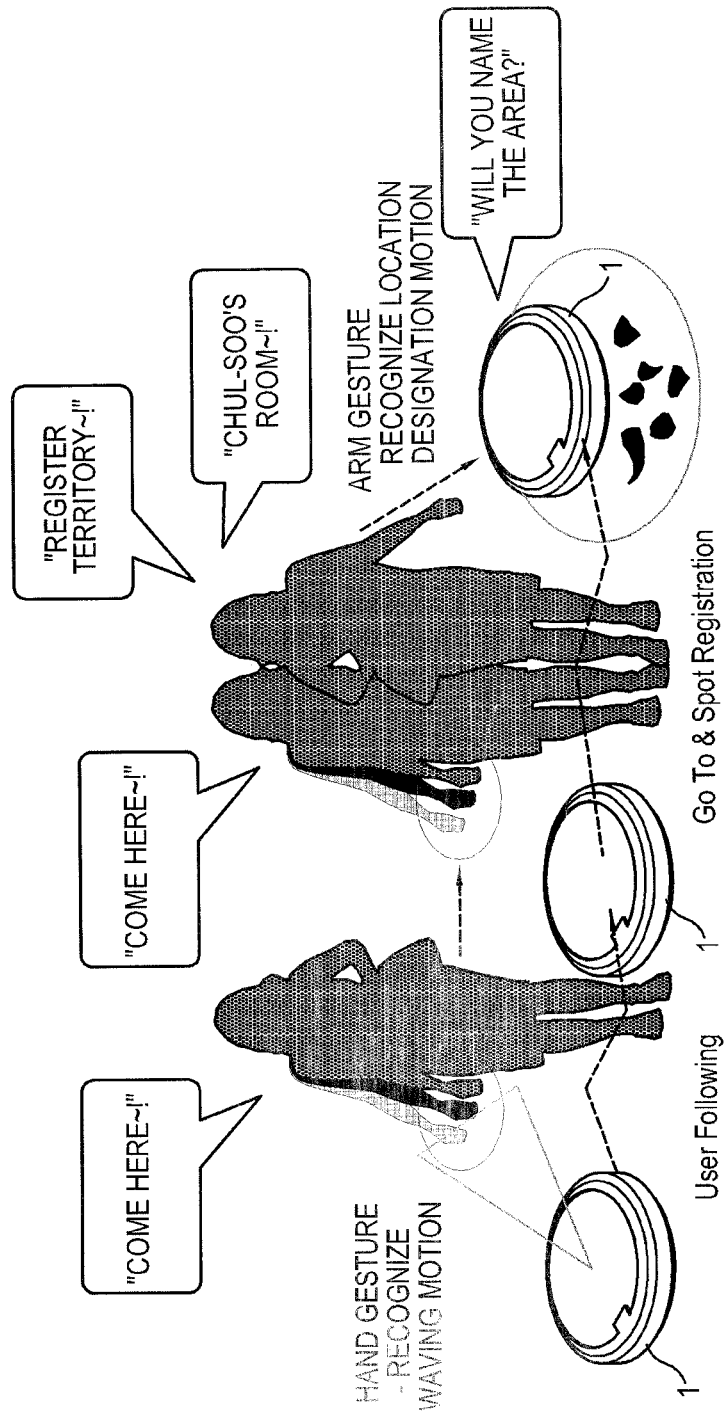
FIGS. 22 and 23 illustrate a method of setting a particular area after moving a moving robot via a gesture, a voice, a pointing device, and the like, according to an embodiment of the present disclosure.
Figure 23:
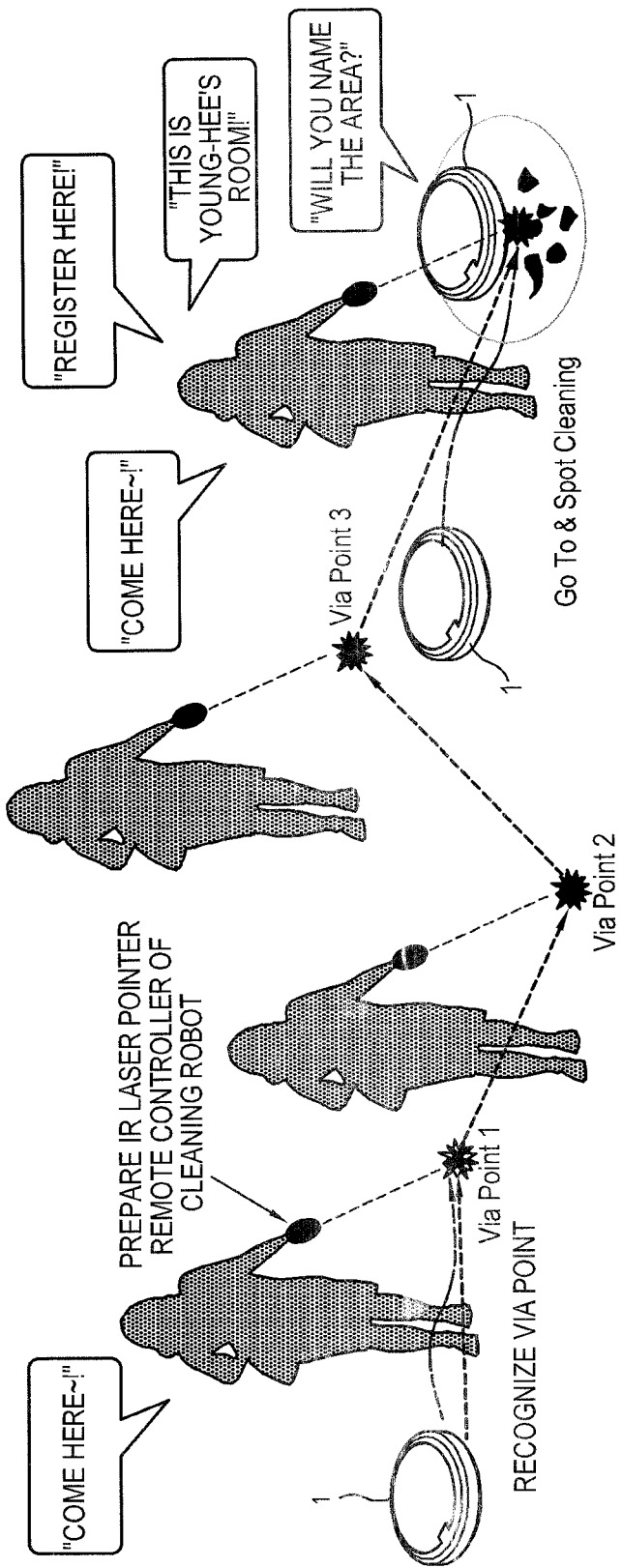

FIGS. 22 and 23 illustrate a method of moving a moving robot by gesture and a voice and setting a particular area according to an embodiment of the present disclosure.

Referring to FIG. 22, a method of moving the moving robot 1 to set a particular area of a home with respect to the moving robot 1 is illustrated.

As shown therein, the moving robot 1 may recognize a user's gesture and a voice through the 2D/3D sensor and follow a user to a particular location. Thereafter, a user may register the concerned area as a particular area in a particular name through a voice command.

Referring to FIG. 23, a pointer which may visually indicate a bottom area may be used to move the moving robot 1 to a particular location. If a user indicates the bottom surface with a pointer and gives a voice command "Come here!", the moving robot 1 may recognize the location of the bottom surface as a via point to the destination and move to the particular location. After the moving robot 1 moves to the particular location, a user may register the concerned area as a particular area in a particular name.

Figure 25:
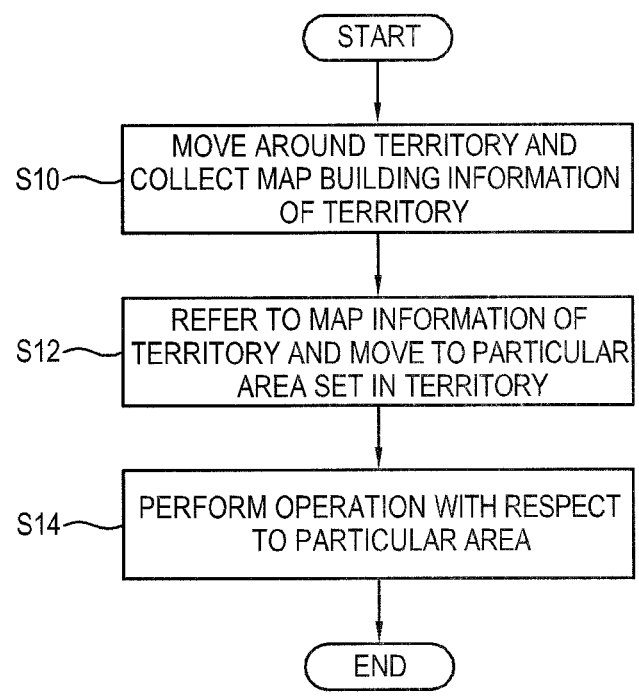
FIG. 25 is a control flowchart of a moving robot according to an embodiment of the present disclosure.

FIG. 25 is a flowchart for generating a map of a territory by using a moving robot according to an embodiment of the present disclosure.

Referring to FIG. 25, the moving robot 1 is purchased by a user, receives the territorial reference information of a user's home, i.e., the territory according to a user's input, moves around the territory and collects map building information of the territory at operation S10. The moving robot 1 may generate a map of the territory based on the collected map building information, transmit the collected map building information to the cloud server 3 and receive the generated map information. The moving robot 1 may refer to the map information of the territory and move to the particular area set in the territory at operation S12. The moving robot 1 may move to the particular area and perform an operation, such as cleaning of the particular area at operation S14.

Figure 26:
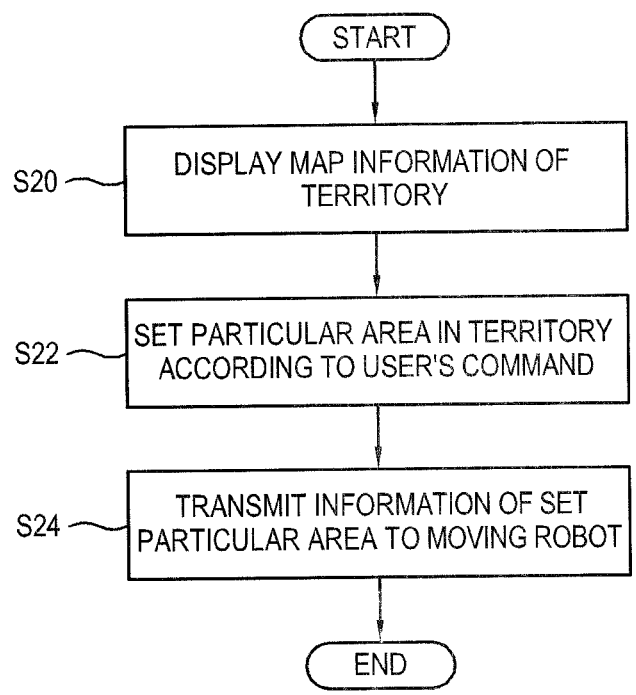
FIG. 26 is a control flowchart of a user terminal apparatus according to an embodiment of the present disclosure.

FIG. 26 is a control flowchart of a user terminal apparatus according to an embodiment of the present disclosure.

Referring to FIG. 26, the user terminal apparatus 2 may receive the map information generated based on the map building information by the moving robot 1 or cloud server 3, and display the map information of the territory on the display unit at operation S20. The user terminal apparatus 2 may set the particular area of the territory according to a user's command at operation S22. The particular area may include setting and naming of the area. The map information including the set particular area is transmitted to the moving robot 1 and the cloud server 3 at operation S24.

The moving robot 1 may generate a map of the environment of the territory, and a user may set structures of the territory and information on the map used for a location-based service to use a more intuitively intelligent service. As the particular area is set on the map, a user may conveniently use the moving robot 1, protect privacy and effectively take action for any risky situation in the territory even when he/she is absent.

As described above, a moving robot according to an embodiment of the present disclosure generates a map of an environment of a territory and allows a user to set a structure of the territory and information on the map used for a location-based service and to use a more intuitively intelligent service.

In addition, the moving robot is used in a more convenient manner since a particular area is set in the map, and user's privacy may be protected and a user may effectively take action for any risk situation even if he/she is absent.

While the present disclosure has been shown and described with reference to various embodiments thereof, it will be understood by those skilled in the art that various changes in form and details may be made therein without departing from the spirit and scope of the present disclosure, as defined by the appended claims and their equivalents.

What is claimed is:

1. A moving robot configured to move around a territory and perform a certain operation, comprising:
   a sensor part configured to collect map building information of the territory; and a controller configured to:
   receive information on a particular area and a context corresponding to the particular area, which are inputted by a user with respect to the map building information, and
   if a user's command including the context and operation information is inputted, control the moving robot to move to the particular area corresponding to the context included in the user's command and perform an operation corresponding to the context at the particular area, based on the received information and the operation information,
   wherein the controller is configured to set the operation according to a user's command.

2. The moving robot of claim 1, wherein the user's command for setting the information on the particular area and the context comprises information of at least one of a device or a structure located in the particular area, and wherein the controller sets the information on the particular area and the context based on the information of the at least one of the device or the structure.

3. The moving robot of claim 1, wherein the user's command comprises at least one of a user's gesture and a voice or a command given through a pointing device.

4. The moving robot of claim 1, further comprising a user input part configured to input a user's command comprising territorial reference information, and wherein the controller collects the map building information of the territory by referring to the territorial reference information input through the user input part.

5. The moving robot of claim 1, further comprising a voice output part configured to output a voice message, wherein the controller is further configured to control the voice output part to output a voice message to set at least one of the information on the particular area and the context or the operation corresponding to a user's command.

6. The moving robot of claim 1, wherein the controller sequentially performs the operation based on location of a plurality of particular areas, if the operation information for the plurality of particular areas is input.

7. A control method of a moving robot, the method comprising:
   moving, by a controller, around a territory and collecting, by a sensor part, map building information of the territory;
   receiving information on a particular area and a context corresponding to the particular area, which are inputted by a user with respect to the map building information;
   if a user's command including the context and operation information is inputted, moving, by the controller, to the particular area corresponding to the context included in the user's command and performing an operation corresponding to the context at the particular area, based on the received information and the operation information,
   wherein the performing of the operation further comprises setting the operation
   according to a user's command.

8. The method of claim 7, wherein the user's command for setting the information on the particular area and the context comprises information of at least one of a device or a structure located in the particular area, and the method further comprising setting the information on the particular area and the context based on the information of the at least one of the device or the structure.

9. The method of claim 7, wherein the user's command comprises at least one of a user's gesture and a voice or a command given through a pointing device.

10. The method of claim 7, wherein the collecting of the map building information comprises collecting the map building information of the territory by referring to the territorial reference information which is input through a user input part.

11. The method of claim 7, wherein the setting of the particular area and operation comprises outputting a voice message to set at least one of the information on the particular area and the context or the operation corresponding to a user's command.

12. The method of claim 7, wherein the performing of the operation comprises sequentially performing the operation based on location of a plurality of particular areas, if the operation information for the plurality of particular areas is input.

* * * * *